(12) United States Patent
Horiguchi

(10) Patent No.: US 12,345,803 B2
(45) Date of Patent: Jul. 1, 2025

(54) RADAR SIGNAL PROCESSING DEVICE, RADAR SIGNAL PROCESSING METHOD, RADAR DEVICE, AND IN-VEHICLE DEVICE

(71) Applicant: Mitsubishi Electric Corporation, Tokyo (JP)

(72) Inventor: Takahiro Horiguchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 462 days.

(21) Appl. No.: 17/886,991

(22) Filed: Aug. 12, 2022

(65) Prior Publication Data

US 2022/0390584 A1 Dec. 8, 2022

Related U.S. Application Data

(63) Continuation of application No. PCT/JP2020/016656, filed on Apr. 16, 2020.

(51) Int. Cl.
*G01S 13/72* (2006.01)
*B60W 40/105* (2012.01)

(52) U.S. Cl.
CPC ......... *G01S 13/726* (2013.01); *B60W 40/105* (2013.01); *B60W 2420/408* (2024.01)

(58) Field of Classification Search
CPC .................................................... G01S 13/726
See application file for complete search history.

(56) References Cited

U.S. PATENT DOCUMENTS

2006/0262007 A1* 11/2006 Bonthron ............... G01S 13/44
  342/107
2013/0234880 A1* 9/2013 Lee ....................... G01S 13/931
  342/70

(Continued)

FOREIGN PATENT DOCUMENTS

CN  104813188 A  7/2015
JP  2014-109439 A  6/2014

(Continued)

OTHER PUBLICATIONS

International Search Report issued in PCT/JP2020/016656, PCT/ISA/210, dated Jul. 7, 2020.

(Continued)

*Primary Examiner* — Marcus E Windrich
(74) *Attorney, Agent, or Firm* — Birch, Stewart, Kolasch & Birch, LLP

(57) ABSTRACT

A radar signal processing device includes processing circuitry configured to repeatedly acquire a beat signal having a frequency of a difference between a frequency of a radar signal and a frequency of a reflected wave of the radar signal reflected by an observation target, repeatedly calculate a distance between a radar device and the observation target using the acquired beat signal, and repeatedly calculate a relative speed between the radar device and the observation target using the acquired beat signal; calculate an incident angle of the reflected wave to an array antenna by using the acquired beat signal and an arrangement interval between a plurality of reception antennas included in the array antenna; and determine whether the observation target is a detection target or a non-detection target due to electromagnetic noise based on the calculated incident angle, the plurality of distances and the plurality of relative speeds.

8 Claims, 13 Drawing Sheets

(56) References Cited

U.S. PATENT DOCUMENTS

| | | | | |
|---|---|---|---|---|
| 2015/0219756 A1* | 8/2015 | Ishimori | ............... | B60W 30/14 342/147 |
| 2015/0338506 A1* | 11/2015 | Yukumatsu | ............... | G01S 7/35 342/27 |
| 2021/0041553 A1* | 2/2021 | Randler | ................ | G01S 13/723 |
| 2021/0215816 A1* | 7/2021 | Xu | .......................... | G01S 13/32 |

FOREIGN PATENT DOCUMENTS

| | | |
|---|---|---|
| JP | 2015-212655 A | 11/2015 |
| JP | 2017-215241 A | 12/2017 |
| JP | 2018-80938 A | 5/2018 |
| WO | WO 2014/084038 A1 | 6/2014 |
| WO | WO 2020/202538 A1 | 10/2020 |

OTHER PUBLICATIONS

Written Opinion of the International Searching Authority, issued in PCT/JP2020/016656, PCT/ISA/237, dated Jul. 7, 2020.

Chinese Office Action and Search Report for Chinese Application No. 202080099552.6, dated Nov. 29, 2024, with English translation of the Office Action.

Chinese Office Action for Chinese Application No. 2025041701555140, dated Apr. 17, 2025, with English translation.

* cited by examiner

RADAR SIGNAL PROCESSING DEVICE, RADAR SIGNAL PROCESSING METHOD, RADAR DEVICE, AND IN-VEHICLE DEVICE

CROSS REFERENCE TO RELATED APPLICATIONS

This application is a Continuation of PCT International Application No. PCT/JP2020/016656 filed on Apr. 16, 2020, which is hereby expressly incorporated by reference into the present application.

TECHNICAL FIELD

The present disclosure relates to a radar signal processing device and a radar signal processing method for calculating a distance between a radar device and an observation target, a radar device including the radar signal processing device, and an in-vehicle device including the radar device.

BACKGROUND ART

Among radar devices that calculate a distance between a radar device and an observation target and calculate a relative speed between the radar device and the observation target, there is a frequency modulated continuous wave (FMCW) radar device that transmits a radar signal whose frequency changes with the lapse of time. The FMCW radar device may erroneously detect a non-detection target due to electromagnetic noise as an observation target.

Patent Literature 1 below discloses a radar device capable of preventing erroneous detection of a non-detection target due to electromagnetic noise.

The radar signal transmitted from the radar device disclosed in Patent Literature 1 includes a first transmission wave whose frequency increases with the lapse of time and a second transmission wave whose frequency decreases with the lapse of time. The radar device generates a first beat signal having a frequency of a difference between a frequency of the first transmission wave and a frequency of a first reflection wave that is a reflection wave of the first transmission wave reflected by an observation target. In addition, the radar device generates a second beat signal having a frequency of a difference between a frequency of the second transmission wave and a frequency of a second reflection wave that is a reflection wave of the second transmission wave reflected by the observation target.

The radar device extracts, as a first peak frequency, a frequency at which a signal intensity is a maximum value among the frequencies included in the first beat signal. In addition, the radar device extracts, as a second peak frequency, a frequency at which a signal intensity is a maximum value among the frequencies included in the second beat signal.

The radar device performs noise determination processing of determining whether or not each of the first peak frequency and the second peak frequency is due to electromagnetic noise. In the noise determination processing, when the first peak frequency and the second peak frequency are substantially the same, it is determined that each of the first peak frequency and the second peak frequency is due to electromagnetic noise.

CITATION LIST

Patent Literature

Patent Literature 1: JP 2018-80938 A

SUMMARY OF INVENTION

Technical Problem

In order for the radar device disclosed in Patent Literature 1 to perform noise determination processing, a radar signal including both a first transmission wave and a second transmission wave needs to be transmitted from the radar device.

Therefore, a radar device that transmits a radar signal having only the first transmission wave or a radar signal having only the second transmission wave cannot perform the noise determination processing. Therefore, a radar device that transmits a radar signal having only a first transmission wave or a radar signal having only a second transmission wave has a problem that a non-detection target due to electromagnetic noise may be erroneously detected as an observation target.

The present disclosure has been made to solve the above-described problems, and it is an object of the present disclosure to provide a radar signal processing device and a radar signal processing method capable of preventing erroneous detection of a non-detection target due to electromagnetic noise when a radar signal includes at least one of a transmission wave whose frequency increases with the lapse of time and a transmission wave whose frequency decreases with the lapse of time.

SOLUTION TO PROBLEM

A radar signal processing device according to the present disclosure includes: processing circuitry configured to repeatedly acquire a beat signal having a frequency of a difference between a frequency of a radar signal whose frequency changes with a lapse of time and a frequency of a reflected wave of the radar signal reflected by an observation target, repeatedly calculate at least one distance between a radar device and the observation target using the acquired beat signal, the at least one distance comprising a plurality of distances, and repeatedly calculate at least one relative speed between the radar device and the observation target using the acquired beat signal, the at least one relative speed comprising a plurality of relative speeds; calculate an incident angle of the reflected wave to an array antenna by using the acquired beat signal and an arrangement interval between a plurality of reception antennas included in the array antenna that receives the reflected wave; and determine whether the observation target is a detection target or a non-detection target due to electromagnetic noise on a basis of the calculated incident angle and the plurality of distances and the plurality of relative speeds having been calculated. The processing circuitry performs determination processing of determining whether the observation target is the detection target or the non-detection target due to electromagnetic noise on a basis of the plurality of distances and the plurality of relative speeds only when an absolute value of the calculated incident angle is equal to or less than a first threshold.

ADVANTAGEOUS EFFECTS OF INVENTION

According to the present disclosure, a radar signal processing device is configured to include a determination unit that determines whether an observation target is a detection target or a non-detection target due to electromagnetic noise on the basis of an incident angle calculated by an angle calculating unit and a plurality of distances and a plurality of relative speeds calculated by a distance speed calculating unit. Therefore, the radar signal processing device according to the present disclosure can prevent erroneous detection of a non-detection target due to electromagnetic noise as long as the radar signal includes at least one of a transmission wave whose frequency increases with the lapse of time and a transmission wave whose frequency decreases with the lapse of time.

BRIEF DESCRIPTION OF DRAWINGS

FIG. 4 is a hardware configuration diagram of a computer in a case where the radar signal processing device 22 is implemented by software, firmware, or the like.

DESCRIPTION OF EMBODIMENTS

In order to explain the present disclosure in more detail, a mode for carrying out the present disclosure will be described below with reference to the accompanying drawings.

First Embodiment

Figure 1:
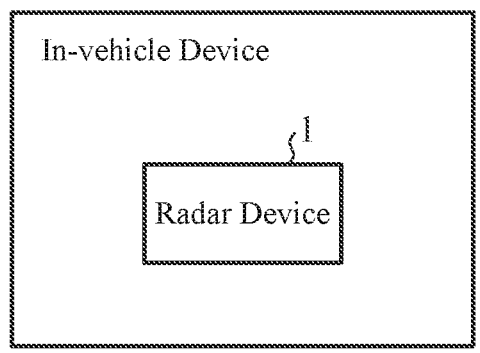
FIG. 1 is a configuration diagram illustrating an in-vehicle device including a radar device 1 according to a first embodiment.

FIG. 1 is a configuration diagram illustrating an in-vehicle device including a radar device 1 according to a first embodiment.

Figure 2:
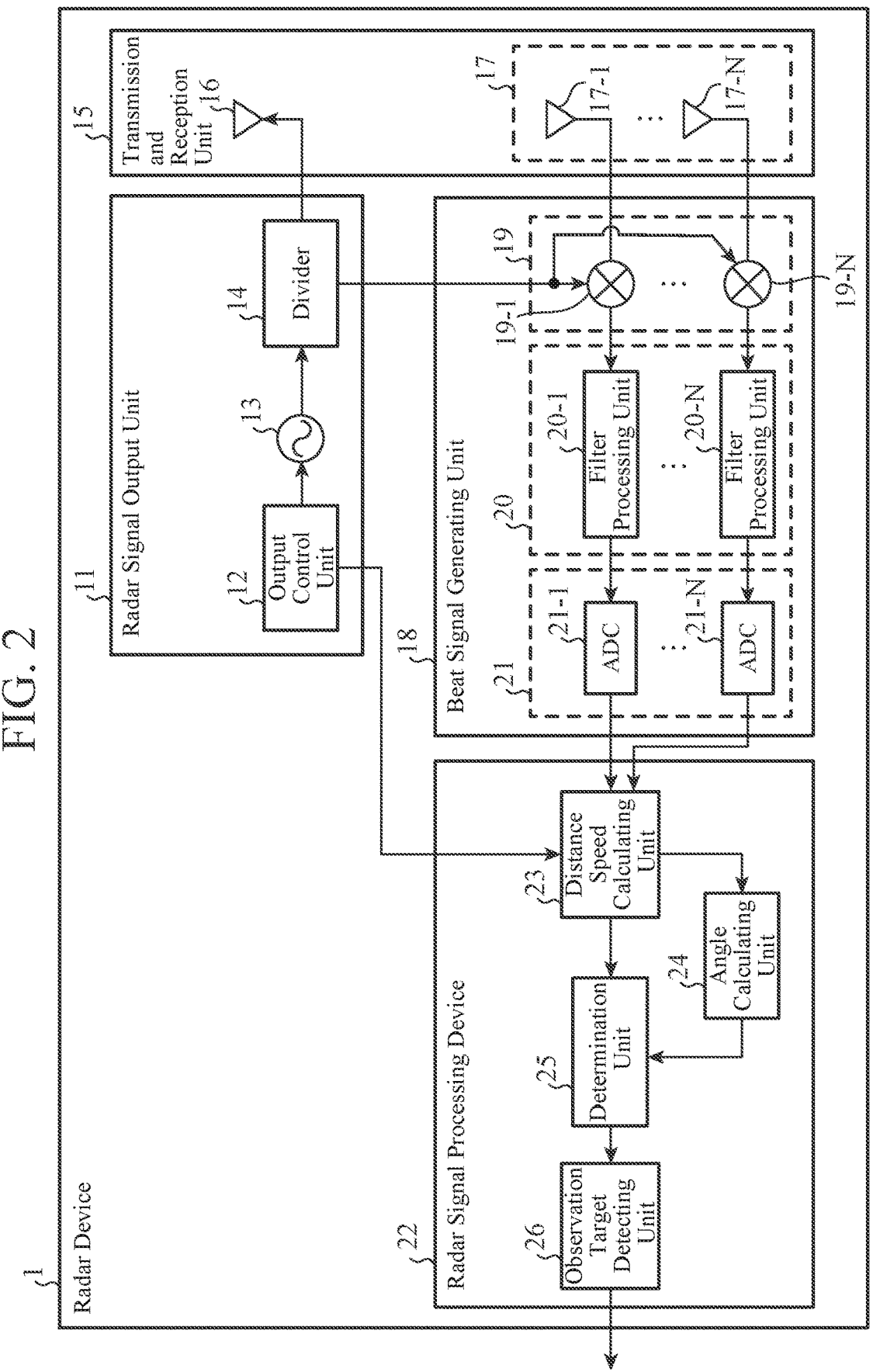
FIG. 2 is a configuration diagram illustrating the radar device 1 including a radar signal processing device 22 according to the first embodiment.

FIG. 2 is a configuration diagram illustrating the radar device 1 including a radar signal processing device 22 according to the first embodiment.

Figure 3:
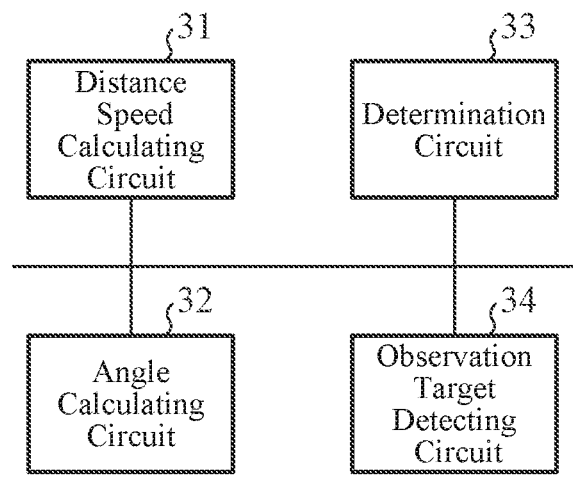
FIG. 3 is a hardware configuration diagram illustrating hardware of the radar signal processing device 22 according to the first embodiment.

FIG. 3 is a hardware configuration diagram illustrating hardware of the radar signal processing device 22 according to the first embodiment.

The in-vehicle device is a device mounted on a vehicle such as an automobile, a motorcycle, or a bicycle. The in-vehicle device includes the radar device 1 that determines whether an observation target is a detection target or a non-detection target due to electromagnetic noise.

In a case where the radar device 1 is mounted on, for example, an automobile, the observation target corresponds to a vehicle such as another automobile, a pedestrian, a guardrail, or the like.

The radar device 1 includes a radar signal output unit 11, a transmission and reception unit 15, a beat signal generating unit 18, and a radar signal processing device 22.

The radar signal output unit 11 includes an output control unit 12, a signal source 13, and a divider 14.

The radar signal output unit 11 intermittently and repeatedly outputs a frequency modulation signal whose frequency changes with the lapse of time to the transmission and reception unit 15 as a radar signal.

The output control unit 12 outputs a control signal indicating an output timing of the radar signal to each of the signal source 13 and a distance speed calculating unit 23 described later.

The signal source 13 intermittently and repeatedly outputs the frequency modulation signal as a radar signal to the divider 14 in accordance with the output timing indicated by the control signal output from the output control unit 12.

The divider 14 divides each of the radar signals repeatedly output from the signal source 13 into two.

The divider 14 outputs one of the divided radar signals to a transmission antenna 16 to be described later, and outputs the other of the divided radar signals as a local oscillation signal to a frequency mixing unit 19 to be described later.

The transmission and reception unit 15 includes a transmission antenna 16 and an array antenna 17.

The transmission and reception unit 15 transmits each of the radar signals repeatedly output from the radar signal output unit 11 toward the observation target, and receives each of the radar signals reflected by the observation target as a reflected wave.

The transmission and reception unit 15 outputs a reception signal of each of the reflected waves to the beat signal generating unit 18.

The transmission antenna 16 radiates each of the radar signals repeatedly output from the divider 14 into space.

The array antenna 17 includes a plurality of reception antennas 17-1 to 17-N. N is an integer of 2 or more.

After each of the radar signals is radiated from the transmission antenna 16 into space, a reception antenna 17-$n$ ($n=1, \ldots, N$) receives each of the radar signals reflected by the observation target as a reflected wave, and outputs a reception signal of each of the received reflected waves to a mixer 19-$n$ of the frequency mixing unit 19.

In the transmission and reception unit 15 illustrated in FIG. 2, the transmission antenna 16 is directly connected to the divider 14. However, this is merely an example, and an amplifier may be connected between the divider 14 and the transmission antenna 16, and the amplifier may amplify the radar signal output from the divider 14 and output the amplified radar signal to the transmission antenna 16.

In addition, in the transmission and reception unit 15 illustrated in FIG. 2, the reception antenna 17-$n$ is directly connected to the frequency mixing unit 19. However, this is merely an example, and an amplifier may be connected between the reception antenna 17-*n* and the mixer 19-*n*, and the amplifier may amplify the reception signal output from the reception antenna 17-*n* and output the amplified reception signal to the mixer 19-*n*.

The beat signal generating unit 18 includes the frequency mixing unit 19, a filter unit 20, and an analog-to-digital converter 21.

The beat signal generating unit 18 generates a beat signal having a frequency of a difference between a frequency of each of the radar signals output from the radar signal output unit 11 and a frequency of each of the reflected waves received by the transmission and reception unit 15.

The beat signal generating unit 18 outputs each of the generated beat signals to the radar signal processing device 22.

The frequency mixing unit 19 includes a plurality of mixers 19-1 to 19-N.

The mixer 19-*n* (*n*=1, . . . , N) mixes the local oscillation signal output from the divider 14 and the reception signal output from the reception antenna 17-*n* to generate a beat signal having a frequency of a difference between a frequency of the local oscillation signal output from the divider 14 and a frequency of the reception signal.

The mixer 19-*n* outputs the beat signal to a filter processing unit 20-*n* described later.

The filter unit 20 includes a plurality of filter processing units 20-1 to 20-N.

The filter processing unit 20-*n* (*n*=1, . . . , N) is implemented by a low pass filter (LPF), a band pass filter (BPF), or the like.

The filter processing unit 20-*n* suppresses an unnecessary component such as spurious included in the beat signal output from the mixer 19-*n*, and outputs the beat signal after the suppression of the unnecessary component to an analog to digital converter (ADC) 21-*n* to be described later.

The analog-to-digital converter 21 includes a plurality of ADCs 21-1 to 21-N.

The ADC 21-*n* (*n*=1, . . . , N) converts the beat signal output from the filter processing unit 20-*n* into digital data, and outputs the digital data to the distance speed calculating unit 23 described later.

The radar signal processing device 22 includes the distance speed calculating unit 23, an angle calculating unit 24, a determination unit 25, and an observation target detecting unit 26.

The distance speed calculating unit 23 is implemented by, for example, a distance speed calculating circuit 31 illustrated in FIG. 3.

The distance speed calculating unit 23 repeatedly acquires the digital data output from the ADC 21-*n* (*n*=1, . . . , N).

The distance speed calculating unit 23 integrates N pieces of digital data output from the ADCs 21-1 to 21-N to calculate combined data of the N pieces of digital data.

Every time combined data is calculated, the distance speed calculating unit 23 calculates the distance between the radar device 1 and the observation target using the combined data, and calculates the relative speed between the radar device 1 and the observation target using the combined data.

The distance between the radar device 1 and the observation target is a distance between the transmission and reception unit 15 of the radar device 1 and the observation target. The relative speed between the radar device 1 and the observation target is a relative speed between the transmission and reception unit 15 of the radar device 1 and the observation target.

The distance speed calculating unit 23 outputs each of the calculated distance and relative speed to the determination unit 25.

The angle calculating unit 24 is implemented by, for example, an angle calculating circuit 32 illustrated in FIG. 3.

The angle calculating unit 24 calculates an incident angle of the reflected wave to the array antenna 17 using the digital data acquired by the distance speed calculating unit 23 and the arrangement interval of the reception antennas 17-1 to 17-N.

The angle calculating unit 24 outputs the incident angle to the determination unit 25.

The determination unit 25 is implemented by, for example, a determination circuit 33 illustrated in FIG. 3.

The determination unit 25 determines whether the observation target is a detection target or a non-detection target due to electromagnetic noise on the basis of the incident angle calculated by the angle calculating unit 24 and the plurality of distances and the plurality of relative speeds calculated by the distance speed calculating unit 23.

That is, only when the absolute value of the incident angle calculated by the angle calculating unit 24 is equal to or less than a first threshold, the determination unit 25 performs determination processing of determining whether the observation target is a detection target or a non-detection target due to electromagnetic noise on the basis of the plurality of distances and the plurality of relative speeds calculated by the distance speed calculating unit 23.

The determination unit 25 outputs a determination result indicating whether the observation target is a detection target or a non-detection target due to electromagnetic noise to the observation target detecting unit 26.

The electromagnetic noise is noise having a constant frequency. Note that, the electromagnetic noise is not limited to noise whose frequency does not change at all, and is assumed to include noise whose frequency slightly changes within a range in which there is no practical problem. As the electromagnetic noise, a continuous wave (CW) electromagnetic wave is assumed.

In the radar device 1 illustrated in FIG. 2, a noise source present outside the radar device 1 is assumed as the noise source. As the noise source, for example, a wireless charging device for charging an electric vehicle is conceivable.

The observation target detecting unit 26 is implemented by, for example, an observation target detecting circuit 34 illustrated in FIG. 3.

When the determination unit 25 determines that the observation target is the detection target, the observation target detecting unit 26 outputs the distance and the relative speed calculated by the distance speed calculating unit 23 and the incident angle calculated by the angle calculating unit 24 to the outside of the radar device 1 as the detection result of the observation target.

When the determination unit 25 determines that the observation target is the non-detection target, the observation target detecting unit 26 outputs information indicating that the non-detection target due to the electromagnetic noise has been detected to the outside of the radar device 1.

In FIG. 2, it is assumed that each of the distance speed calculating unit 23, the angle calculating unit 24, the determination unit 25, and the observation target detecting unit 26, which are components of the radar signal processing device 22, is implemented by dedicated hardware as illustrated in FIG. 3. That is, it is assumed that the radar signal processing device 22 is implemented by the distance speed calculating circuit 31, the angle calculating circuit 32, the determination circuit 33, and the observation target detecting circuit 34.

Each of the distance speed calculating circuit 31, the angle calculating circuit 32, the determination circuit 33, and the observation target detecting circuit 34 corresponds to, for example, a single circuit, a composite circuit, a programmed processor, a parallel-programmed processor, an application specific integrated circuit (ASIC), a field-programmable gate array (FPGA), or a combination thereof.

The components of the radar signal processing device 22 are not limited to those implemented by dedicated hardware, and the radar signal processing device 22 may be implemented by software, firmware, or a combination of software and firmware.

The software or firmware is stored in a memory of a computer as a program. The computer means hardware that executes a program, and corresponds to, for example, a central processing unit (CPU), a central processing device, a processing unit, an arithmetic unit, a microprocessor, a microcomputer, a processor, or a digital signal processor (DSP).

Figure 4:
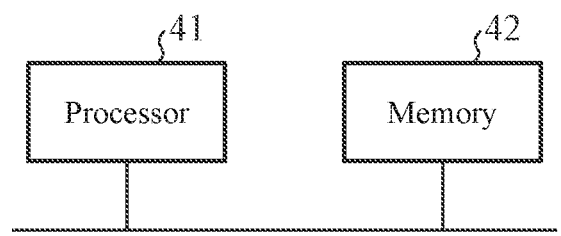

FIG. 4 is a hardware configuration diagram of a computer in a case where the radar signal processing device 22 is implemented by software, firmware, or the like.

In a case where the radar signal processing device 22 is implemented by software, firmware, or the like, a program for causing a computer to execute each of processing procedures performed in the distance speed calculating unit 23, the angle calculating unit 24, the determination unit 25, and the observation target detecting unit 26 is stored in a memory 42. Then, a processor 41 of the computer executes the program stored in the memory 42.

In addition, FIG. 3 illustrates an example in which each of the components of the radar signal processing device 22 is implemented by dedicated hardware, and FIG. 4 illustrates an example in which the radar signal processing device 22 is implemented by software, firmware, or the like. However, this is merely an example, and some components in the radar signal processing device 22 may be implemented by dedicated hardware, and the remaining components may be implemented by software, firmware, or the like.

Figure 5:
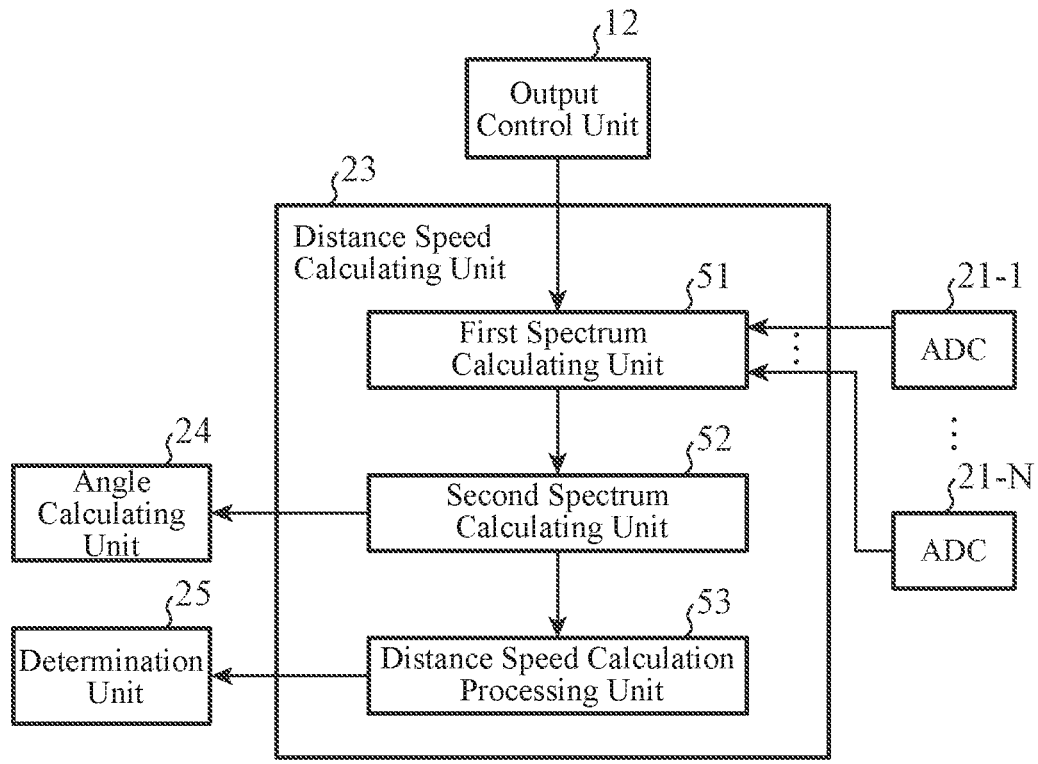
FIG. 5 is a configuration diagram illustrating a distance speed calculating unit 23 of the radar signal processing device 22.

FIG. 5 is a configuration diagram illustrating the distance speed calculating unit 23 of the radar signal processing device 22.

The distance speed calculating unit 23 includes a first spectrum calculating unit 51, a second spectrum calculating unit 52, and a distance speed calculation processing unit 53.

The first spectrum calculating unit 51 repeatedly acquires the digital data output from the ADC 21-$n$ ($n=1, \ldots, N$) in synchronization with the output timing indicated by the control signal output from the output control unit 12.

The first spectrum calculating unit 51 repeatedly calculates a first frequency spectrum $fs_{1,a}$ by performing Fourier transform on each repeatedly acquired digital data in a distance direction.

The first spectrum calculating unit 51 outputs each of the first frequency spectra $fs_{1,a}$ repeatedly calculated using the digital data output from the ADC 21-$n$ to the second spectrum calculating unit 52.

The first spectrum calculating unit 51 calculates combined data of N pieces of digital data by adding the N pieces of digital data output from the ADCs 21-1 to 21-N in synchronization with the output timing indicated by the control signal output from the output control unit 12.

Every time the combined data is calculated, the first spectrum calculating unit 51 calculates first frequency spectra $fs_{1,b}$ by the number of N reception antennas 17-$n$ by performing Fourier transform on the combined data in the distance direction.

The first spectrum calculating unit 51 outputs each of the first frequency spectra $fs_{1,b}$ repeatedly calculated using the combined data to the second spectrum calculating unit 52.

The second spectrum calculating unit 52 repeatedly acquires K (K is an integer of 2 or more) first frequency spectra $fs_{1,a}$ related to the ADC 21-$n$ from the first spectrum calculating unit 51.

Every time the K first frequency spectra $fs_{1,a}$ are acquired, the second spectrum calculating unit 52 calculates a second frequency spectrum $fs_{2,a}$ by performing Fourier transform on the K first frequency spectra $fs_{1,a}$ in a Doppler direction.

The second spectrum calculating unit 52 outputs the second frequency spectrum $fs_{2,a}$ related to the ADC 21-$n$ to the angle calculating unit 24. The second frequency spectrum $fs_{2,a}$ output from the second spectrum calculating unit 52 to the angle calculating unit 24 is not the relative speed itself, but includes information on the relative speed. Therefore, information on the relative speed is output from the second spectrum calculating unit 52 to the angle calculating unit 24.

The second spectrum calculating unit 52 integrates the K first frequency spectra $fs_{1,a}$ related to the ADC 21-$n$, and outputs an integrated first frequency spectrum $fs_{1,a}$ to the angle calculating unit 24. The first frequency spectrum $fs_{1,a}$ output from the second spectrum calculating unit 52 to the angle calculating unit 24 is not the distance itself, but includes information on the distance. Therefore, information on the distance is output from the second spectrum calculating unit 52 to the angle calculating unit 24.

The second spectrum calculating unit 52 repeatedly acquires K first frequency spectra $fs_{1,b}$ calculated using the combined data from the first spectrum calculating unit 51.

Every time the K first frequency spectra $fs_{1,b}$ are acquired, the second spectrum calculating unit 52 calculates a second frequency spectrum $fs_{2,b}$ by performing Fourier transform on the K first frequency spectra $fs_{1,b}$ in the Doppler direction.

The second spectrum calculating unit 52 outputs the second frequency spectra $fs_{2,b}$ to the distance speed calculation processing unit 53.

The second spectrum calculating unit 52 integrates the K first frequency spectra $fs_{1,b}$, and outputs an integrated first frequency spectrum $fs_{1,b}'$ to the distance speed calculation processing unit 53.

The distance speed calculation processing unit 53 acquires the integrated first frequency spectrum $fs_{1,b}'$ from the second spectrum calculating unit 52.

Every time the integrated first frequency spectrum $fs_{1,b}'$ is acquired, the distance speed calculation processing unit 53 detects a beat frequency which is a frequency corresponding to a peak value of the integrated first frequency spectrum $fs_{1,b}'$.

The distance speed calculation processing unit 53 calculates the distance between the radar device 1 and the observation target on the basis of the detected beat frequency.

The distance speed calculation processing unit 53 acquires the second frequency spectrum $fs_{2,b}$ from the second spectrum calculating unit 52.

Every time the second frequency spectrum $fs_{2,b}$ is acquired, the distance speed calculation processing unit 53 detects a Doppler frequency, which is a frequency corresponding to the peak value of the second frequency spectrum $fs_{2,b}$.

The distance speed calculation processing unit 53 calculates the relative speed between the radar device 1 and the observation target on the basis of the detected Doppler frequency.

Every time the distance and the relative speed are calculated, the distance speed calculation processing unit 53 outputs each of the calculated distance and relative speed to the determination unit 25.

Figure 6:
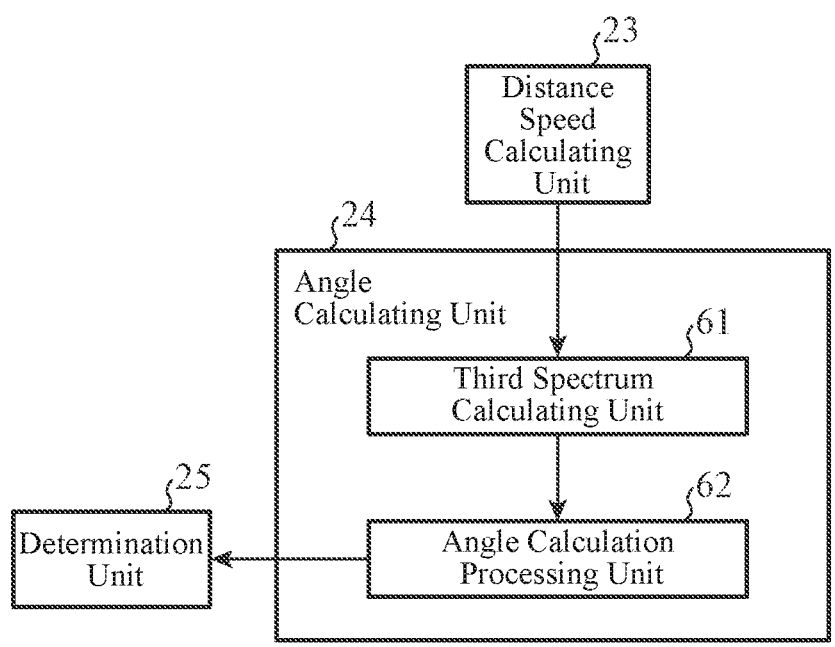
FIG. 6 is a configuration diagram illustrating an angle calculating unit 24 of the radar signal processing device 22.

FIG. 6 is a configuration diagram illustrating the angle calculating unit 24 of the radar signal processing device 22.

The angle calculating unit 24 includes a third spectrum calculating unit 61 and an angle calculation processing unit 62.

The third spectrum calculating unit 61 acquires N first frequency spectra fs and N second frequency spectra $fs_{2,a}$ from the second spectrum calculating unit 52 of the distance speed calculating unit 23.

The third spectrum calculating unit 61 generates N Range-Doppler maps including the first frequency spectra $fs_{1,a}$ and the second frequency spectra $fs_{2,a}$, and calculates a third frequency spectrum $fs_3$ by performing Fourier transform on the N Range-Doppler maps.

The third spectrum calculating unit 61 outputs the third frequency spectrum $fs_3$ to the angle calculation processing unit 62.

The angle calculation processing unit 62 detects a frequency corresponding to a peak value of the third frequency spectrum $fs_3$ output from the third spectrum calculating unit 61.

The angle calculation processing unit 62 calculates an incident angle of the reflected wave to the array antenna 17 using the frequency corresponding to the detected peak value and the arrangement interval of the reception antennas 17-1 to 17-N.

The angle calculating unit 24 outputs the incident angle to the determination unit 25.

Next, the operation of the radar device 1 illustrated in FIG. 2 will be described.

Figure 7:
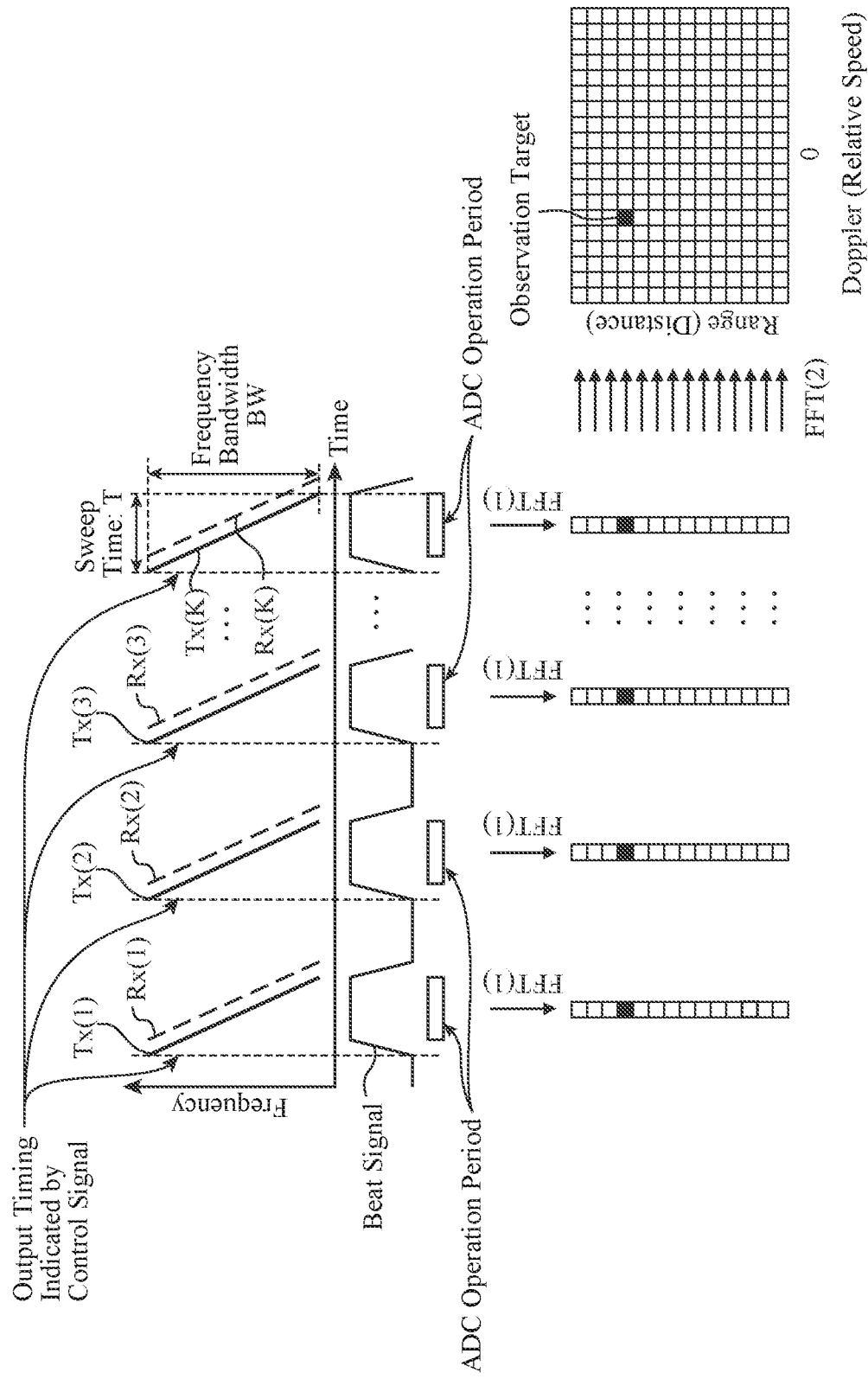
FIG. 7 is an explanatory diagram illustrating a radar signal, a reception signal, a beat signal, and signal processing performed in the distance speed calculating unit 23.

FIG. 7 is an explanatory diagram illustrating a radar signal, a reception signal, a beat signal, and signal processing performed in the distance speed calculating unit 23.

Figure 8:
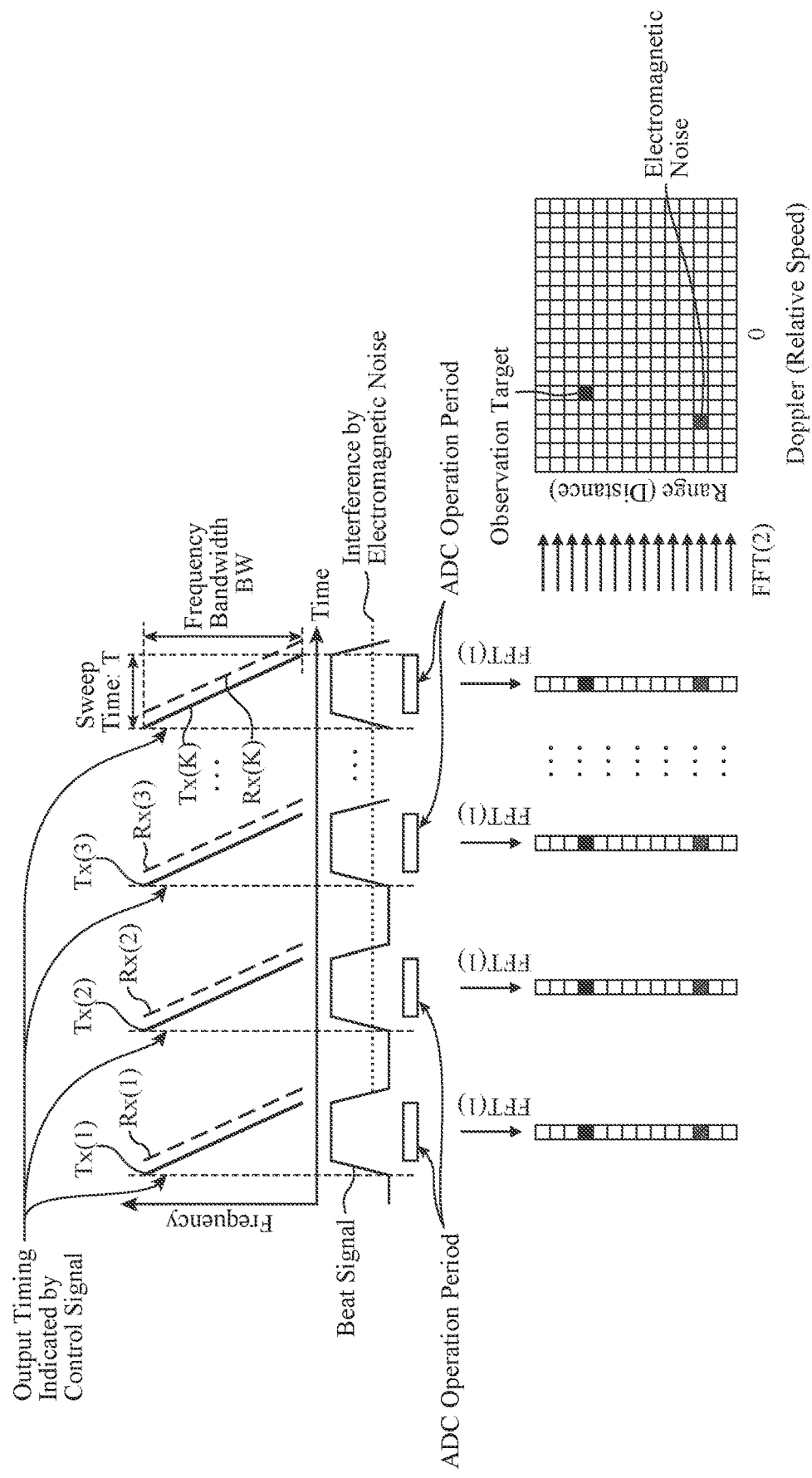
FIG. 8 is an explanatory diagram illustrating a radar signal, a reception signal, a beat signal, and signal processing performed in the distance speed calculating unit 23 in a case where electromagnetic noise is input to an ADC 21-$n$ ($n=1, \ldots, N$).

FIG. 8 is an explanatory diagram illustrating a radar signal, a reception signal, a beat signal, and signal processing performed in the distance speed calculating unit 23 in a case where electromagnetic noise is input to the ADC 21-$n$ ($n=1, \ldots, N$).

In FIGS. 7 and 8, Tx(1), Tx(2), Tx(3), . . . , and Tx(K) represent radar signals, and Rx(1), Rx(2), Rx(3), and Rx(K) represent reception signals.

The radar signal Tx(k) ($k=1, \ldots, K$) is a frequency modulation signal whose frequency decreases with the lapse of time. T is a sweep time of the radar signal Tx(k) and is a time on the order of microseconds. BW is a frequency bandwidth of the radar signal Tx(k).

In FIGS. 7 and 8, the radar signal Tx(k) is a frequency modulation signal whose frequency decreases with the lapse of time. However, this is merely an example, and the radar signal Tx(k) may be a frequency modulation signal whose frequency increases with the lapse of time. In addition, the radar signal Tx(k) may include a frequency modulation signal whose frequency increases with the lapse of time and a frequency modulation signal whose frequency decreases with the lapse of time.

First, the output control unit 12 outputs a control signal indicating an output timing of the radar signal Tx(k) to each of the signal source 13 and the distance speed calculating unit 23.

As illustrated in FIGS. 7 and 8, the output timing of the radar signal Tx(k) is a time interval longer than the sweep time T.

The signal source 13 repeatedly outputs the radar signal Tx(k) to the divider 14 in accordance with the output timing indicated by the control signal output from the output control unit 12.

Every time the radar signal Tx(k) is received from the signal source 13, the divider 14 divides the radar signal Tx(k) into two.

The divider 14 outputs one of the divided radar signals Tx(k) to the transmission antenna 16, and outputs the other of the divided radar signals Tx(k) as a local oscillation signal Lo(k) to each of the mixers 19-1 to 19-N in the frequency mixing unit 19.

Every time the radar signal Tx(k) is received from the divider 14, the transmission antenna 16 radiates the radar signal Tx(k) into space.

The reception antenna 17-$n$ ($n=1, \ldots, N$) of the array antenna 17 receives, as a reflected wave, the radar signal Tx(k) reflected by the observation target after the radar signal Tx(k) is radiated from the transmission antenna 16 into space, and outputs a reception signal Rx(k) of the received reflected wave to the mixer 19-$n$.

Every time the mixer 19-$n$ receives the local oscillation signal Lo(k) from the divider 14 and every time the mixer receives the reception signal Rx(k) from the reception antenna 17-$n$, the mixer mixes the local oscillation signal Lo(k) and the reception signal Rx(k).

The mixer 19-$n$ mixes the local oscillation signal Lo(k) and the reception signal Rx(k) to generate a beat signal having a frequency of a difference between the frequency of the local oscillation signal Lo(k) and the frequency of the reception signal Rx(k).

Every time the beat signal is generated, the mixer 19-$n$ outputs the generated beat signal to the filter processing unit 20-$n$.

Note that, during a period in which the local oscillation signal Lo(k) is not output from the divider 14, the mixer 19-$n$ does not generate a beat signal and does not output the beat signal to the filter processing unit 20-$n$.

Every time the beat signal is received from the mixer 19-$n$, the filter processing unit 20-$n$ suppresses an unnecessary component such as spurious included in the beat signal, and outputs the beat signal after the suppression of the unnecessary component to the ADC 21-$n$.

Every time the beat signal is received from the filter processing unit 20-$n$, the ADC 21-$n$ converts the beat signal into digital data, and outputs the digital data to the distance speed calculating unit 23 of the radar signal processing device 22.

When the electromagnetic noise is input to the ADC 21, the electromagnetic noise may be superimposed on the beat signal as illustrated in FIG. 8.

The operation period of the ADC 21-$n$ corresponds to a period in which the mixer 19-$n$ outputs the beat signal to the filter processing unit 20-$n$.

Hereinafter, the operation of the radar signal processing device 22 will be described.

Figure 9:
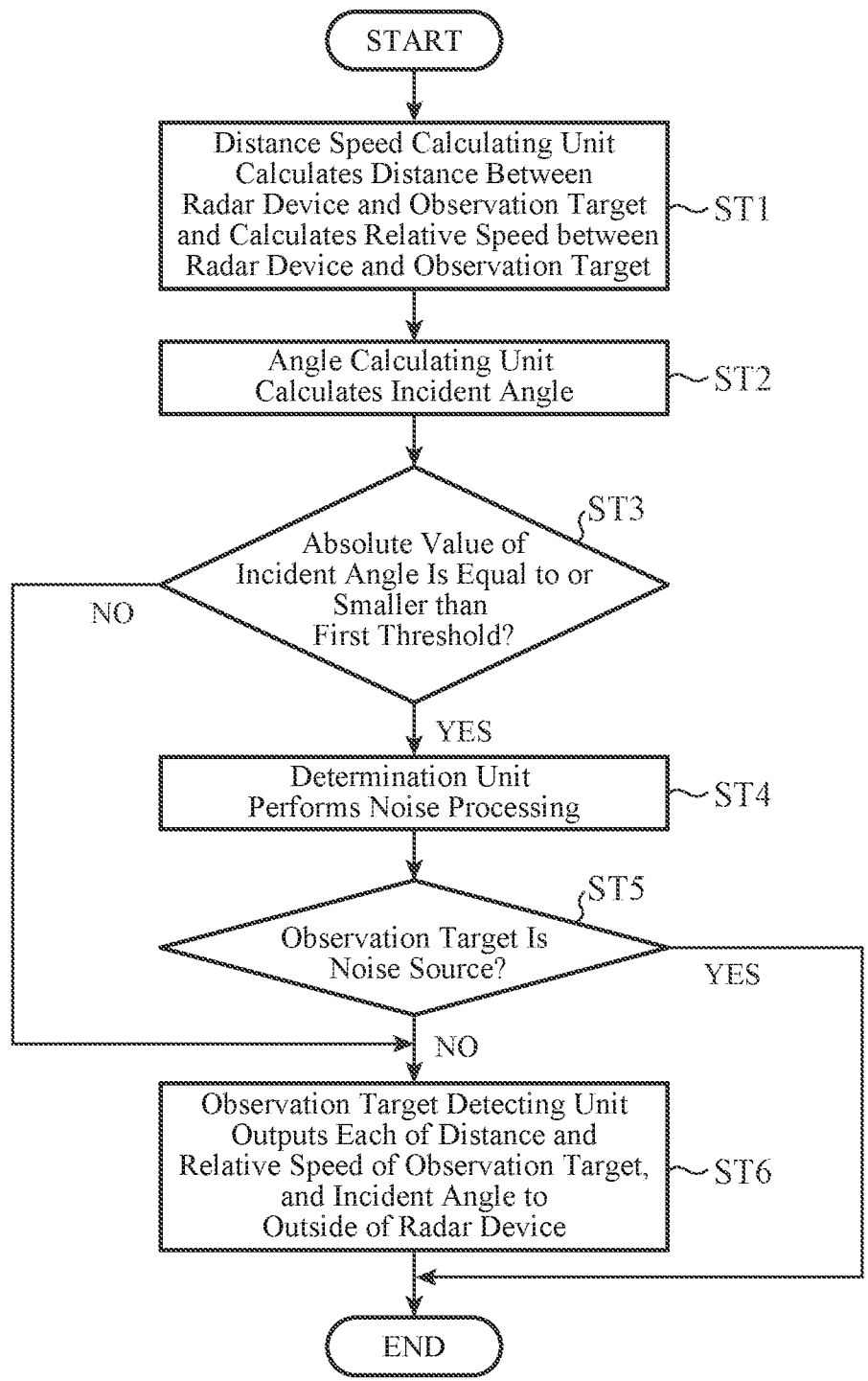
FIG. 9 is a flowchart illustrating a radar signal processing method which is a processing procedure performed in the radar signal processing device 22.

FIG. 9 is a flowchart illustrating a radar signal processing method which is a processing procedure performed in the radar signal processing device 22.

Figure 10:
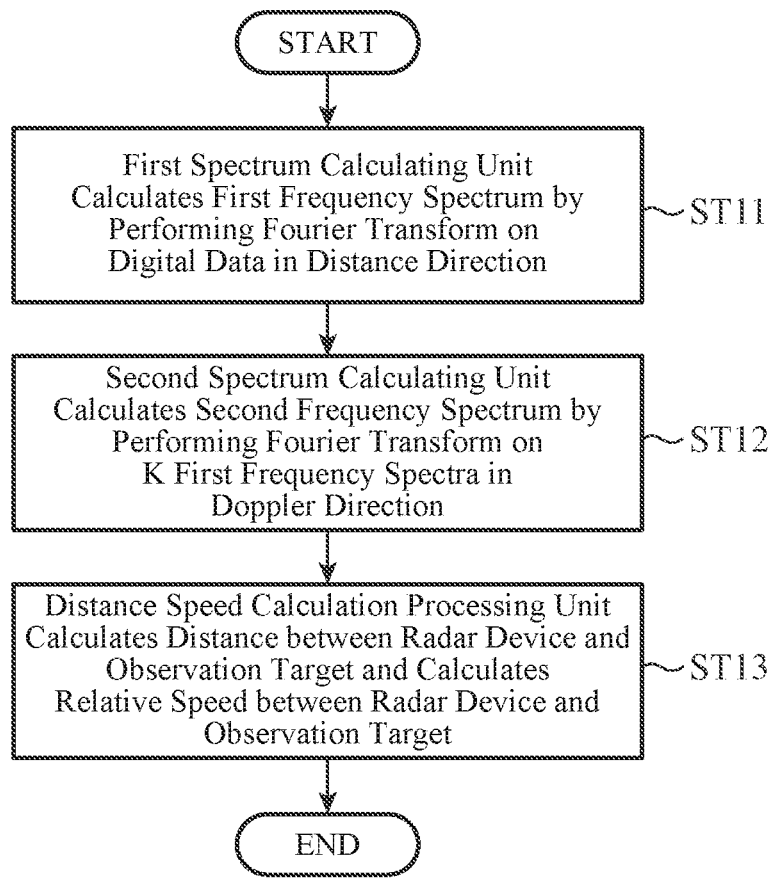
FIG. 10 is a flowchart illustrating a processing procedure performed in the distance speed calculating unit 23.

FIG. 10 is a flowchart illustrating a processing procedure performed in the distance speed calculating unit 23.

Figure 11:
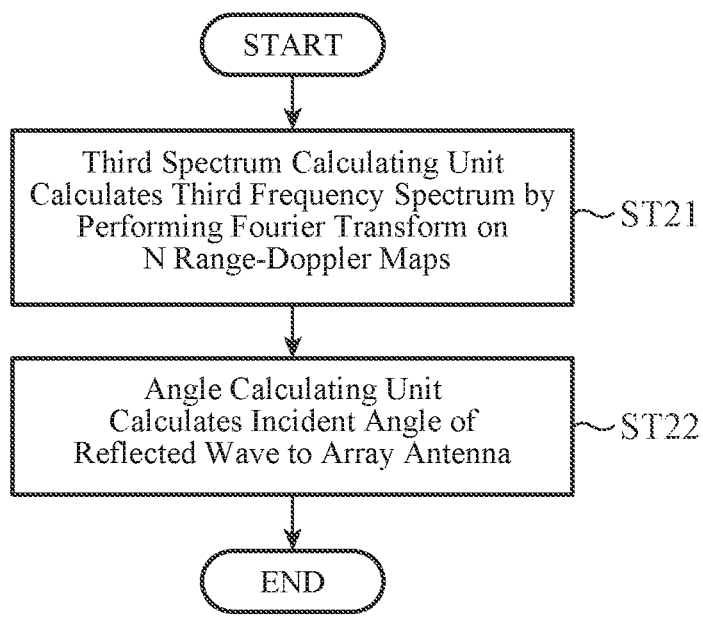
FIG. 11 is a flowchart illustrating a processing procedure performed in the angle calculating unit 24.

FIG. 11 is a flowchart illustrating a processing procedure performed in the angle calculating unit 24.

Figure 12:
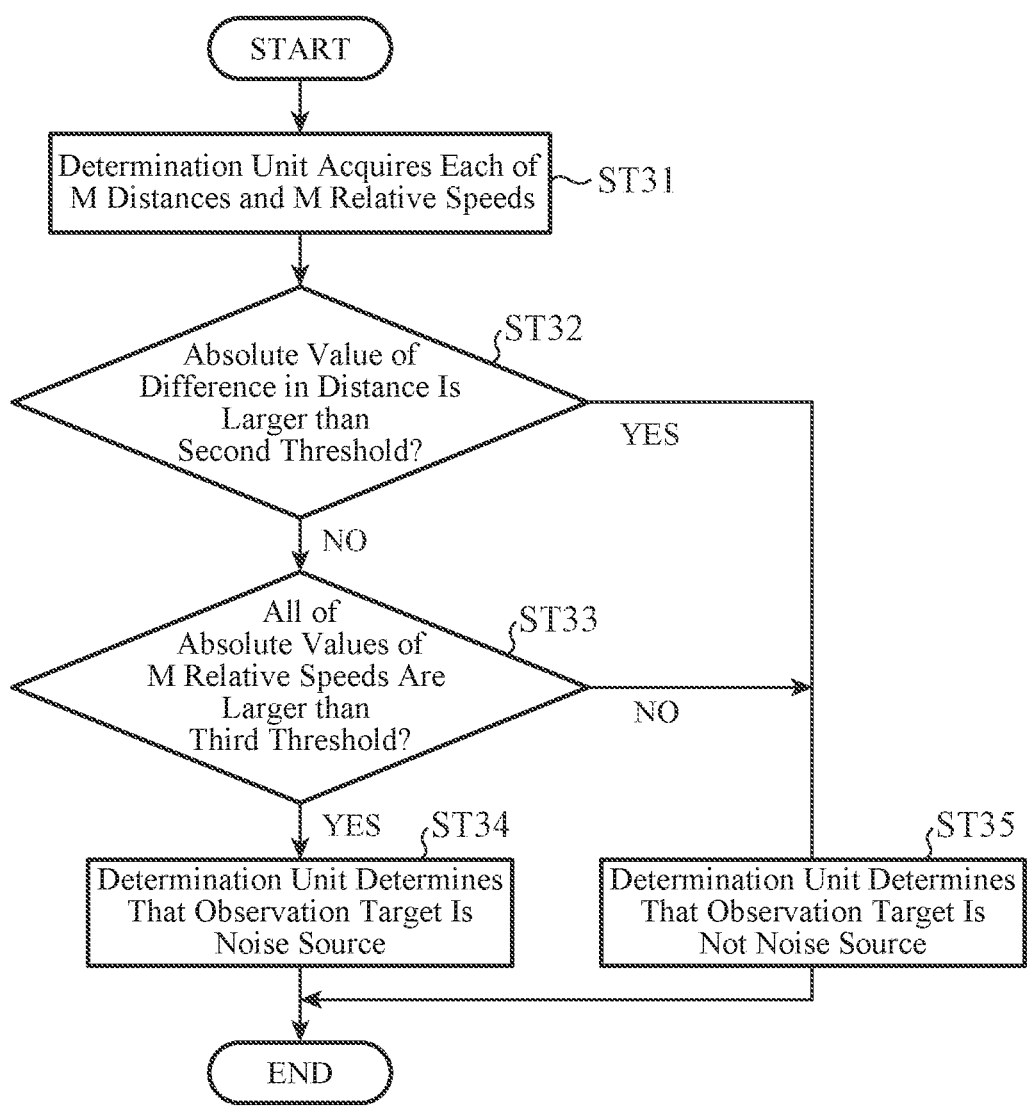
FIG. 12 is a flowchart illustrating a processing procedure performed in a determination unit 25.

FIG. 12 is a flowchart illustrating a processing procedure performed in the determination unit 25.

The distance speed calculating unit 23 repeatedly acquires the digital data output from the ADC 21-$n$ (n=1, ..., N).

Every time digital data is acquired from the ADC 21-$n$, the distance speed calculating unit 23 calculates the distance between the radar device 1 and the observation target using the digital data (step ST1 in FIG. 9).

In addition, the distance speed calculating unit 23 calculates the relative speed between the radar device 1 and the observation target using the digital data (step ST1 in FIG. 9).

Every time each of the distance and the relative speed is calculated, the distance speed calculating unit 23 outputs each of the calculated distance and relative speed to the angle calculating unit 24.

The distance speed calculating unit 23 calculates combined data of a plurality of pieces of digital data output from the ADCs 21-1 to 21-N.

Every time combined data is calculated, the distance speed calculating unit 23 calculates the distance between the radar device 1 and the observation target using the combined data (step ST1 in FIG. 9).

In addition, the distance speed calculating unit 23 calculates the relative speed between the radar device 1 and the observation target using the combined data (step ST1 in FIG. 9).

Every time each of the distance and the relative speed is calculated, the distance speed calculating unit 23 outputs each of the calculated distance and relative speed to the determination unit 25.

Hereinafter, calculation processing of the distance speed calculating unit 23 will be specifically described.

The first spectrum calculating unit 51 repeatedly acquires the digital data output from the ADC 21-$n$ (n=1, ..., N) during the period in which the local oscillation signal Lo(k) is output from the divider 14 in synchronization with the output timing indicated by the control signal output from the output control unit 12.

Every time digital data is acquired from the ADC 21-$n$, the first spectrum calculating unit 51 calculates the first frequency spectrum $fs_{1,a}$ by performing Fourier transform on the digital data in the distance direction (step ST11 in FIG. 10).

In FIGS. 7 and 8, FFT(1) represents the Fourier transform in the distance direction by the first spectrum calculating unit 51.

As the digital data is Fourier-transformed in the distance direction, the spectrum value of the reception signal Rx(k) (k=1, ..., K) of the reflected wave from the observation target is integrated into the beat frequency $F_{sb\_r}$ shown in the following Formula (1).

$$F_{sb\_r} = \frac{2BW \cdot R}{c \cdot T} \quad (1)$$

In Formula (1), R is a distance between the radar device 1 illustrated in FIG. 2 and the observation target, and c is the speed of light.

Furthermore, the digital data is Fourier-transformed in the distance direction, whereby the spectrum value of the electromagnetic noise is integrated into the frequency $F_{n\_r}$ of the electromagnetic noise.

Every time K first frequency spectra $fs_{1,a}$ are calculated, the first spectrum calculating unit 51 outputs the K first frequency spectra $fs_{1,a}$ to the second spectrum calculating unit 52.

In addition, the first spectrum calculating unit 51 calculates combined data of N pieces of digital data by integrating the N pieces of digital data output from the ADCs 21-1 to 21-N in synchronization with the output timing indicated by the control signal output from the output control unit 12.

Every time the combined data is calculated, the first spectrum calculating unit 51 calculates first frequency spectra $fs_{1,b}$ by the number of N reception antennas 17-$n$ by performing Fourier transform on the combined data in the distance direction.

Every time K first frequency spectra $fs_{1,b}$ are calculated, the first spectrum calculating unit 51 outputs the K first frequency spectra $fs_{1,b}$ to the second spectrum calculating unit 52.

The second spectrum calculating unit 52 repeatedly acquires K first frequency spectra $fs_{1,a}$ related to the ADC 21-$n$ from the first spectrum calculating unit 51.

Every time the K first frequency spectra $fs_{1,a}$ are acquired, the second spectrum calculating unit 52 calculates the second frequency spectrum $fs_{2,a}$ by performing Fourier transform on the K first frequency spectra $fs_{1,a}$ in the Doppler direction (step ST12 in FIG. 10).

In FIGS. 7 and 8, FFT(2) represents the Fourier transform in the Doppler direction by the second spectrum calculating unit 52.

As the K first frequency spectra $fs_{1,a}$ are Fourier-transformed in the Doppler direction, the spectrum value of the reception signal Rx(k) of the reflected wave from the observation target is integrated into a Doppler frequency $F_{sb\_v}$ expressed by the following Formula (2) corresponding to the relative speed between the radar device 1 illustrated in FIG. 2 and the observation target.

$$F_{sb\_v} = \frac{2f \cdot v}{c} \quad (2)$$

In Formula (2), f represents the center frequency of the local oscillation signal Lo(k), and v represents the relative speed between the radar device 1 illustrated in FIG. 2 and the observation target.

In addition, as the K first frequency spectra $fs_{1,a}$ are Fourier-transformed in the Doppler direction, the spectrum value of the electromagnetic noise is integrated into the Doppler frequency $F_{n\_v}$ corresponding to the sum of the phase difference corresponding to the relative speed between the radar device 1 illustrated in FIG. 2 and the noise source and the phase difference between the noise source and the radar signal.

Every time the second frequency spectrum $fs_{2,a}$ is calculated, the second spectrum calculating unit 52 outputs the second frequency spectrum $fs_{2,a}$ to the angle calculating unit 24.

In addition, the second spectrum calculating unit 52 integrates the K first frequency spectra $fs_{1,a}$, and outputs the integrated first frequency spectrum $fs_{1,a}'$ to the angle calculating unit 24.

The second spectrum calculating unit 52 repeatedly acquires K first frequency spectra $fs_{1,b}$ calculated using the combined data from the first spectrum calculating unit 51.

Every time the K first frequency spectra $fs_{1,b}$ are acquired, the second spectrum calculating unit 52 calculates the second frequency spectrum $fs_{2,b}$ by performing Fourier transform on the K first frequency spectra $fs_{1,b}$ in the Doppler direction.

Every time the second frequency spectrum $fs_{2,b}$ is calculated, the second spectrum calculating unit 52 outputs the second frequency spectrum $fs_{2,b}$ to the distance speed calculation processing unit 53.

The second spectrum calculating unit 52 integrates the K first frequency spectra $fs_{1,b}$ calculated using the combined data, and outputs the integrated first frequency spectrum $fs_{1,b}'$ to the distance speed calculation processing unit 53.

In the radar device 1 illustrated in FIG. 2, the second spectrum calculating unit 52 calculates the second frequency spectrum $fs_{2,b}$ by performing Fourier transform in the Doppler direction on the K first frequency spectra $fs_{1,b}$ calculated using the combined data, and outputs the second frequency spectrum $fs_{2,b}$ to the distance speed calculation processing unit 53. However, this is merely an example, and the second spectrum calculating unit 52 may output the second frequency spectrum $fs_{2,a}$ output to the angle calculating unit 24 to the distance speed calculation processing unit 53. In addition, the second spectrum calculating unit 52 may output the integrated first frequency spectrum $fs_{1,a}'$ output to the angle calculating unit 24 to the distance speed calculation processing unit 53.

Every time the integrated first frequency spectrum $fs_{1,b}'$ is received from the second spectrum calculating unit 52, the distance speed calculation processing unit 53 detects the beat frequency $F_{sb\_r}$ corresponding to the peak value of the first frequency spectrum $fs_{1,b}'$.

Specifically, the distance speed calculation processing unit 53 compares the plurality of spectrum values included in the first frequency spectrum $fs_{1,b}'$ with a beat frequency detection threshold $Th_b$.

The distance speed calculation processing unit 53 detects a spectrum value larger than the threshold $Th_b$ among the plurality of spectrum values as a peak value. The beat frequency detection threshold $Th_b$ may be stored in the internal memory of the distance speed calculation processing unit 53 or may be provided from the outside of the radar device 1.

When detecting the peak value, the distance speed calculation processing unit 53 detects a frequency corresponding to the peak value as the beat frequency $F_{sb\_r}$ in the first frequency spectrum $fs_{1,b}'$.

The beat frequency $F_{sb\_r}$ detected by the distance speed calculation processing unit 53 may be a frequency related to the observation target, but may be the frequency $F_{n\_r}$ of the electromagnetic noise in a case where the electromagnetic noise is input to the ADC 21.

When detecting the beat frequency $F_{sb\_r}$ corresponding to the peak value of the first frequency spectrum $fs_{1,b}'$, the distance speed calculation processing unit 53 substitutes the beat frequency $F_{sb\_r}$ into the following Formula (3) to calculate the distance R between the radar device 1 illustrated in FIG. 2 and the observation target (step ST13 in FIG. 10).

$$R = \frac{c \cdot T \cdot F_{sb\_r}}{2BW} \quad (3)$$

The distance R calculated by the distance speed calculation processing unit 53 may be a distance between the radar device 1 and the observation target, but may be a false detection distance due to electromagnetic noise in a case where the electromagnetic noise is input to the ADC 21-$n$.

Every time the second frequency spectrum $fs_{2,b}$ is received from the second spectrum calculating unit 52, the distance speed calculation processing unit 53 detects the Doppler frequency $F_{sb\_v}$ corresponding to the peak value of the second frequency spectrum $fs_{2,b}$.

Specifically, the distance speed calculation processing unit 53 compares the plurality of spectrum values included in the second frequency spectrum $fs_{2,b}$ with the Doppler frequency detection threshold $TH_d$.

The distance speed calculation processing unit 53 detects a spectrum value larger than the threshold $Th_d$ among the plurality of spectrum values as a peak value. The Doppler frequency detection threshold $Th_d$ may be stored in the internal memory of the distance speed calculation processing unit 53 or may be provided from the outside of the radar device 1.

When detecting the peak value, the distance speed calculation processing unit 53 detects a frequency corresponding to the peak value as the Doppler frequency $F_{sb\_v}$ in the second frequency spectrum $fs_{2,b}$.

The Doppler frequency $F_{sb\_v}$ detected by the distance speed calculation processing unit 53 may be a frequency related to the observation target, but may be the Doppler frequency $F_{n\_v}$ of the electromagnetic noise in a case where the electromagnetic noise is input to the ADC 21-$n$.

When detecting the Doppler frequency $F_{sb\_v}$ corresponding to the peak value of the second frequency spectrum $fs_{2,b}$, the distance speed calculation processing unit 53 substitutes the Doppler frequency $F_{sb\_v}$ into the following Formula (4) to calculate the relative speed v between the radar device 1 illustrated in FIG. 2 and the observation target (step ST13 in FIG. 10).

$$v = \frac{c \cdot F_{sb\_v}}{2f} \quad (4)$$

The relative speed v calculated by the distance speed calculation processing unit 53 may be a relative speed between the radar device 1 and the observation target, but may be a relative speed due to electromagnetic noise in a case where the electromagnetic noise is input to the ADC 21-$n$.

Every time each of the distance R and the relative speed v is calculated, the distance speed calculation processing unit 53 outputs each of the distance R and the relative speed v to the determination unit 25.

Figure 13:
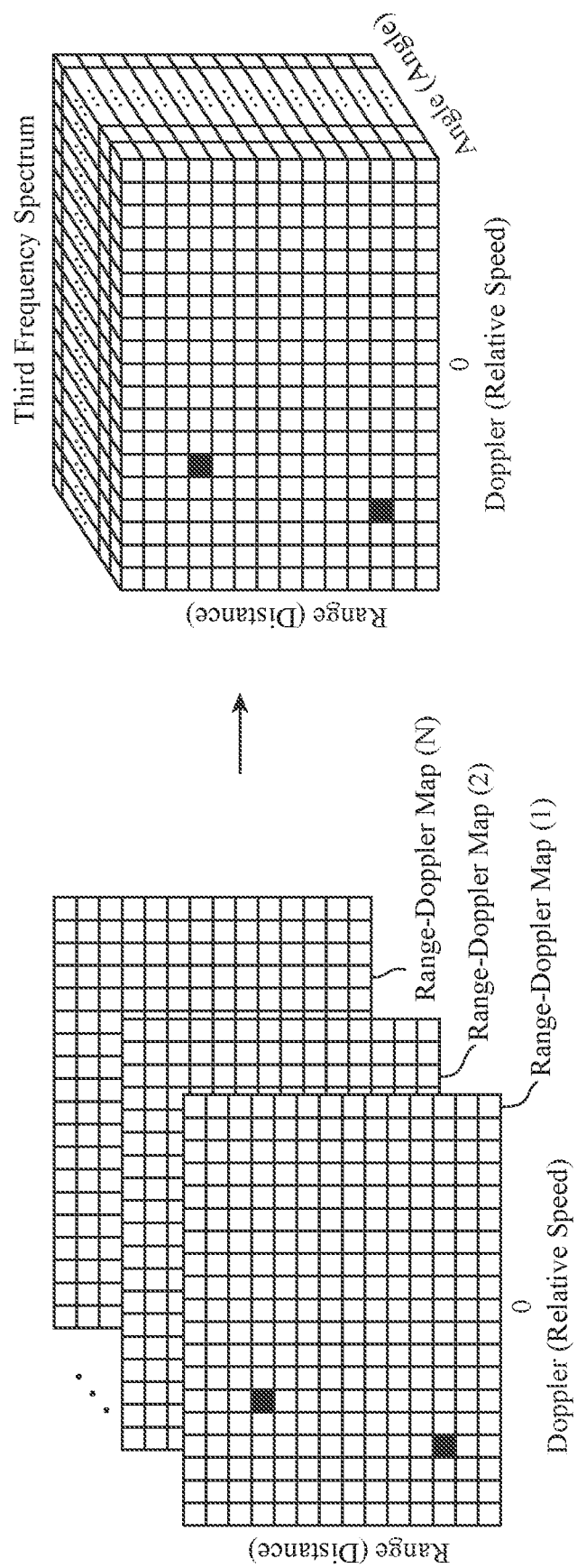
FIG. 13 is an explanatory diagram illustrating signal processing of the angle calculating unit 24.

FIG. 13 is an explanatory diagram illustrating signal processing performed in the angle calculating unit 24.

The third spectrum calculating unit 61 of the angle calculating unit 24 acquires N first frequency spectra $fs_{1,a}'$ and N second frequency spectra $fs_{2,a}$ from the second spectrum calculating unit 52 of the distance speed calculating unit 23.

The third spectrum calculating unit 61 generates a Range-Doppler map (n) related to the ADC 21-$n$ including a first frequency spectrum $fs_{1,a}'(n)$ related to the ADC 21-$n$ among the N first frequency spectra $fs_{1,a}$ and a second frequency spectrum $fs_{2,a}(n)$ related to the ADC 21-$n$ among the N second frequency spectra $fs_{2,a}$. The third spectrum calculating unit 61 generates N Range-Doppler maps (1) to (N) in total.

The third spectrum calculating unit 61 calculates a third frequency spectrum $fs_3$ as illustrated in FIG. 13 by performing Fourier transform on the N Range-Doppler maps (1) to (N) (step ST21 in FIG. 11).

The third spectrum calculating unit 61 outputs the third frequency spectrum fs$_3$ to the angle calculation processing unit 62.

The angle calculation processing unit 62 acquires the third frequency spectrum fs$_3$ from the third spectrum calculating unit 61.

The angle calculation processing unit 62 detects a frequency F$_{sb\_\theta}$ corresponding to the peak value of the third frequency spectrum fs$_3$.

The angle calculation processing unit 62 calculates an incident angle θ of the reflected wave to the array antenna 17 using the frequency F$_{sb\_\theta}$ corresponding to the detected peak value and the arrangement interval d of the reception antennas 17-1 to 17-N as expressed in the following Formula (5) (Step ST2 in FIG. 9 and step ST22 in FIG. 11).

$$\theta = \sin^{-1}\left(\frac{F_{sb\_\theta}\lambda}{2\pi d}\right) \quad (5)$$

In Formula (5), λ represents a wavelength of a radar signal.

Figure 14:
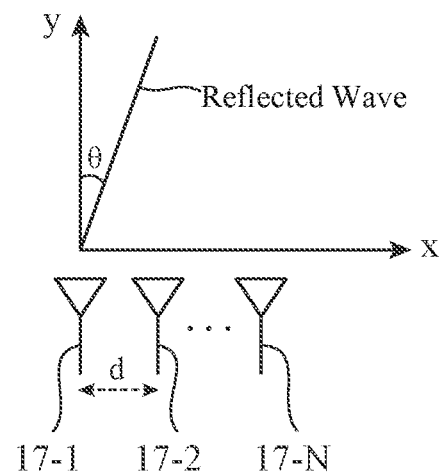
FIG. 14 is an explanatory diagram illustrating an incident angle θ of a reflected wave to an array antenna 17.

FIG. 14 is an explanatory diagram illustrating an incident angle λ of a reflected wave to the array antenna 17.

In FIG. 14, the reception antenna 17-1 is disposed at the origin of the x-y coordinate system, and the reception antennas 17-1 to 17-N are arranged in a direction parallel to the y axis.

An interval between the reception antenna 17-n and the reception antenna 17-(n+1) is d. n=1, 2, . . . , N−1.

The angle calculating unit 24 outputs the incident angle θ to the determination unit 25.

The angle θ calculated by the angle calculation processing unit 62 may be an incident angle of the reflected wave to the array antenna 17, but may be an angle due to electromagnetic noise in a case where the electromagnetic noise is input to the ADC 21-n.

The determination unit 25 determines whether the observation target is a detection target or a non-detection target due to the electromagnetic noise on the basis of the incident angle θ calculated by the angle calculating unit 24 and the plurality of distances R and the plurality of relative speeds v calculated by the distance speed calculation processing unit 53 of the distance speed calculating unit 23.

Hereinafter, the noise determination processing by the determination unit 25 will be specifically described.

First, the determination unit 25 compares the absolute value of the incident angle θ with the first threshold Th$_1$. The first threshold Th$_1$ is, for example, a value of ½ of the resolution of the incident angle θ. The first threshold Th$_1$ may be stored in the internal memory of the determination unit 25 or may be provided from the outside of the radar signal processing device 22.

If the absolute value of the incident angle θ is equal to or smaller than the first threshold Th$_1$ (step ST3 in FIG. 9: YES), the determination unit 25 performs noise determination processing described below (step ST4 in FIG. 9).

If the absolute value of the incident angle θ is larger than the first threshold Th$_1$ (step ST3 in FIG. 9: NO), the determination unit 25 does not perform the noise determination processing described below.

In a case where the electromagnetic noise is input to each of the ADCs 21-1 to 21-N, since the arrangement of the signal wirings of the ADCs 21-n corresponding to the reception antennas 17-1 to 17-N is very short compared to the wavelength of the electromagnetic noise, the noise induced in each of the signal wirings can be regarded as the same phase. In a state in which the output signals of the ADCs 21-1 to 21-N are in the same phase, the frequency F$_{sb\_\theta}$=0, that is, the incident angle θ is 0 degrees. Therefore, erroneous detection of a non-detection target due to electromagnetic noise occurs when the incident angle θ is near 0 degrees. That is, the erroneous detection of the non-detection target due to the electromagnetic noise occurs when the absolute value of the incident angle θ is equal to or less than the first threshold Th$_1$. In other words, when the absolute value of the incident angle θ is larger than the first threshold Th$_1$, there is a low possibility that erroneous detection of a non-detection target due to electromagnetic noise occurs.

Figure 15:
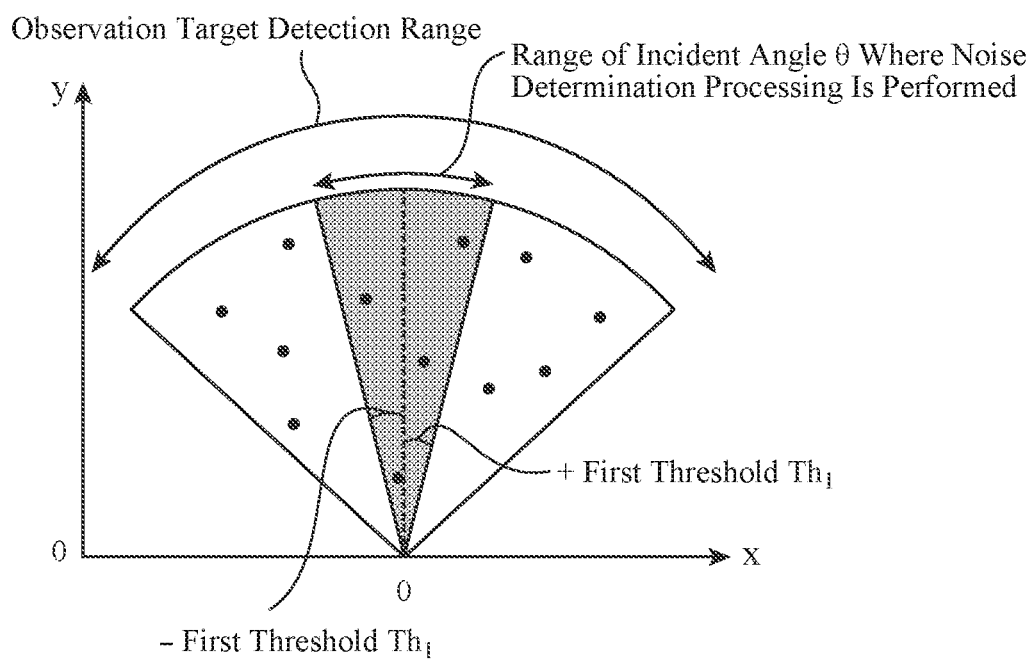
FIG. 15 is an explanatory diagram illustrating a range of an incident angle θ on which noise determination processing by the determination unit 25 is performed.

FIG. 15 is an explanatory diagram illustrating a range of the incident angle θ on which the noise determination processing by the determination unit 25 is performed.

The range of the incident angle θ on which the noise determination processing is performed is a range of—the first threshold Th$_1$ to +the first threshold Th$_1$.

The range of the incident angle θ on which the detection processing of the observation target is performed is wider than the range of the incident angle θ on which the noise determination processing is performed, and includes the range of the incident angle θ on which the noise determination processing is performed.

The determination unit 25 performs the noise determination processing only in a case where the absolute value of the incident angle θ is equal to or less than the first threshold Th$_1$, and does not perform the noise determination processing described below in a case where the absolute value of the incident angle θ is larger than the first threshold Th$_1$ (in a case of step ST3 in FIG. 9: NO). Therefore, it is possible to suppress an increase in the processing load or an increase in the memory amount due to the noise determination processing.

The determination unit 25 acquires M (M is an integer of 2 or more) distances R and M relative speeds v from the distance speed calculation processing unit 53 (step ST31 in FIG. 12).

Here, in order to simplify the description, it is assumed that all of the M distances R repeatedly calculated by the distance speed calculation processing unit 53 are distances between the radar device 1 and the observation target or false detection distances due to electromagnetic noise.

In addition, it is assumed that all of the M relative speeds v repeatedly calculated by the distance speed calculation processing unit 53 are relative speeds between the radar device 1 and the observation target or relative speeds due to electromagnetic noise.

The determination unit 25 calculates an absolute value |ΔR$_M$| of a difference ΔR$_M$ between the first calculated distance and the Mth calculated distance among the M distances R.

The determination unit 25 compares the absolute value |ΔR$_M$| of the difference ΔR$_M$ with a second threshold Th$_2$. As the second threshold Th$_2$, for example, a value of the resolution+r of the distance R calculated by the distance speed calculating unit 23 is used. r is, for example, twice the resolution of the distance R. The second threshold Th$_2$ may be stored in the internal memory of the determination unit 25 or may be provided from the outside of the radar signal processing device 22.

The frequency of the electromagnetic noise output from the noise source is a constant frequency. Therefore, if the distance R calculated by the distance speed calculating unit 23 is a false detection distance due to electromagnetic noise, it is conceivable that the change in the M distances R repeatedly calculated by the distance speed calculating unit 23 is very small, and the absolute value |ΔR$_M$| of the change in the distances R is equal to or less than the second threshold Th$_2$.

For example, in a case where the observation target is stationary, if the radar device 1 illustrated in FIG. 2 is moving, the distance between the radar device 1 illustrated in FIG. 2 and the observation target changes. As the stationary observation target, for example, a guardrail can be considered.

Therefore, in a case where the observation target is a stationary object, if the radar device 1 illustrated in FIG. 2 is moving, the absolute value ΔR$_M$ of the change in the M distances R repeatedly calculated by the distance speed calculating unit 23 is considered to be larger than the second threshold Th$_2$.

For example, in a case where the observation target is an oncoming vehicle of the vehicle on which the radar device 1 illustrated in FIG. 2 is mounted, if the radar device 1 illustrated in FIG. 2 is moving, the distance between the radar device 1 illustrated in FIG. 2 and the observation target greatly changes.

Therefore, in a case where the observation target is an oncoming vehicle, if the radar device 1 illustrated in FIG. 2 is moving, the absolute value |ΔR$_M$| of the change in the M distances R repeatedly calculated by the distance speed calculating unit 23 is considered to be larger than the second threshold Th$_2$.

For example, in a case where the observation target is a preceding vehicle of the vehicle on which the radar device 1 illustrated in FIG. 2 is mounted, even if the radar device 1 illustrated in FIG. 2 is moving, the distance between the radar device 1 illustrated in FIG. 2 and the observation target may hardly change. In a case where the vehicle on which the radar device 1 illustrated in FIG. 2 is mounted is traveling in the same direction at substantially the same speed as that of the preceding vehicle, the distance between the radar device 1 illustrated in FIG. 2 and the observation target hardly changes.

Therefore, in a case where the observation target is the preceding vehicle, even if the radar device 1 illustrated in FIG. 2 is moving, the absolute value |ΔR$_M$| of the change in the M distances R repeatedly calculated by the distance speed calculating unit 23 may not be larger than the second threshold Th$_2$.

If the absolute value |ΔR$_M$| of the difference ΔR$_M$ is larger than the second threshold Th$_2$ (step ST32 in FIG. 12: YES), the determination unit 25 determines that the observation target is a detection target and is not a noise source (step ST35 in FIG. 12).

Other than the case where the observation target is a stationary object such as a guardrail, in a case where the observation target is, for example, an oncoming vehicle, the determination unit 25 determines that "the observation target is not a noise source".

If the absolute value ΔR$_M$ of the difference ΔR$_M$ is equal to or less than the second threshold Th$_2$ (step ST32 in FIG. 12: NO), the determination unit 25 compares the absolute values of the M relative speeds v with a third threshold Th$_3$. As the third threshold Th$_3$, for example, 1 km/h is used. However, this is merely an example, and the third threshold Th$_3$ may be 2 km/h, 3 km/h, or the like. The third threshold Th$_3$ may be stored in the internal memory of the determination unit 25 or may be provided from the outside of the radar signal processing device 22.

The relative speed v due to electromagnetic noise varies depending on the relative speed between the radar device 1 and the noise source, as well as the frequency of the electromagnetic noise, the sweep time of the radar signal, and the output timing of the radar signal. Therefore, the relative speed v due to the electromagnetic noise is likely to be a value other than zero. Therefore, when the third threshold Th$_3$ is a value sufficiently smaller than the maximum value of the relative speed between the radar device 1 and the observation target, if the relative speed v calculated by the distance speed calculating unit 23 is a relative speed due to electromagnetic noise, there is a high possibility that all the absolute values of the M relative speeds v repeatedly calculated by the distance speed calculating unit 23 are larger than the third threshold.

For example, when the observation target is a preceding vehicle, if the vehicle on which the radar device 1 illustrated in FIG. 2 is mounted is traveling in the same direction at substantially the same speed as that of the preceding vehicle, the relative speed v between the radar device 1 illustrated in FIG. 2 and the preceding vehicle becomes a relative speed close to 0. Therefore, if the relative speed v calculated by the distance speed calculating unit 23 is the relative speed between the radar device 1 and the preceding vehicle, there is a high possibility that one or more relative speeds v among the M relative speeds v repeatedly calculated by the distance speed calculating unit 23 will be equal to or less than the third threshold Th$_3$.

If all the absolute values of the M relative speeds v are larger than the third threshold Th$_3$ (step ST33 in FIG. 12: YES), the determination unit 25 determines that the observation target is a non-detection target and is a noise source (step ST34 in FIG. 12).

If one or more relative speeds v among the absolute values of the M relative speeds v are equal to or less than the third threshold Th$_3$ (step ST33 in FIG. 12: NO), the determination unit 25 determines that the observation target is a detection target and is not a noise source (step ST35 in FIG. 12).

For example, in a case where the observation target is a preceding vehicle, there is a high possibility that the determination unit 25 determines that "the observation target is not electromagnetic noise".

When determining that the observation target is the detection target and is not the noise source (step ST5 in FIG. 9: NO), the determination unit 25 outputs each of the M distances R, the M relative speeds v, and the incident angle θ to the observation target detecting unit 26.

The observation target detecting unit 26 outputs each of the M distances R, the M relative speeds v, and the incident angle θ to the outside of the radar device 1 (step ST6 in FIG. 9).

When determining that the observation target is a non-detection target and is a noise source (step ST5 in FIG. 9: YES), the determination unit 25 discards each of the M distances R, the M relative speeds v, and the incident angle θ.

When the determination unit 25 determines that the observation target is the non-detection target, the observation target detecting unit 26 outputs information indicating that the non-detection target due to the electromagnetic noise has been detected to the outside of the radar device 1.

Note that the observation target detecting unit 26 may output each of the false detection distance R due to the electromagnetic noise, the relative speed v, and the incident angle θ due to the electromagnetic noise to the outside of the radar device 1.

Here, in order to simplify the description, it is assumed that all of the M distances R repeatedly calculated by the distance speed calculating unit 23 are distances between the radar device 1 and the observation target or false detection distances due to electromagnetic noise.

In addition, it is assumed that all of the M relative speeds v repeatedly calculated by the distance speed calculating unit 23 are relative speeds between the radar device 1 and the observation target or relative speeds due to electromagnetic noise.

However, in a case where the electromagnetic noise output from the noise source is input to the ADC 21-$n$ at the timing when the reflected wave from the observation target is received by the reception antenna 17-$n$, for example, if the number of observation targets is one, the distance speed calculating unit 23 calculates two distances R in each of the M times of calculation processing. Among the two distances R, one distance R is a distance R between the radar device 1 and the observation target, and the other distance R is a false detection distance R due to electromagnetic noise. Note that, the distance speed calculating unit 23 cannot determine which of the two calculated distances R is the distance R between the radar device 1 and the observation target and which of the distances R is the false detection distance R due to electromagnetic noise.

In addition, the distance speed calculating unit 23 calculates two relative speeds v in each of the M times of calculation processing. Among the two relative speeds v, one relative speed v is a relative speed v between the radar device 1 and the observation target, and the other relative speed v is a relative speed v due to electromagnetic noise. Note that, the distance speed calculating unit 23 cannot determine which of the two calculated relative speeds v is the relative speed v between the radar device 1 and the observation target and which of the relative speeds v is the relative speed v due to the electromagnetic noise.

The determination unit 25 acquires (2×M) distances R and (2×M) relative speeds v from the distance speed calculating unit 23 as processing results of the M times of calculation processing.

When acquiring (2×M) distances R from the distance speed calculating unit 23, the determination unit 25 classifies the (2×M) distances R into a group related to the observation target and a group related to the noise source. Here, for convenience of description, it is assumed that the group related to the observation target is a group (1) and the group related to the noise source is a group (2).

Further, when acquiring (2×M) relative speeds v from the distance speed calculating unit 23, the determination unit 25 classifies the (2×M) relative speeds v into a group (1) related to the observation target and a group (2) related to the noise source.

The processing of classifying the (2×M) distances R into two groups (1) and (2) and the processing of classifying the (2×M) relative speeds v into two groups (1) and (2) are known techniques, and thus detailed description thereof will be omitted.

The determination unit 25 determines whether or not the observation target is a noise source by performing the above-described determination processing for each of the two groups (1) and (2) (step ST5 in FIG. 9).

Since the group (1) is determined to be a group related to the observation target by performing the above determination processing, the determination unit 25 outputs the distance R belonging to the group (1) to the observation target detecting unit 26 as the distance R between the radar device 1 and the observation target. In addition, the determination unit 25 outputs the relative speed v belonging to the group (1) to the observation target detecting unit 26 as the relative speed v between the radar device 1 and the observation target. In addition, the determination unit 25 outputs the incident angle θ belonging to the group (1) to the observation target detecting unit 26 as the incident angle θ.

Since the group (2) is determined to be a group related to a noise source by performing the above determination processing, the determination unit 25 discards the distance R belonging to the group (2) as the false detection distance R due to electromagnetic noise. In addition, the determination unit 25 discards the relative speed v belonging to the group (2) as the relative speed v due to the electromagnetic noise. In addition, the determination unit 25 discards the incident angle θ belonging to the group (2).

In the first embodiment described above, the radar signal processing device 22 includes the distance speed calculating unit 23 to repeatedly acquire a beat signal having a frequency of a difference between the frequency of the radar signal whose frequency changes with the lapse of time and the frequency of the reflected wave of the radar signal reflected by the observation target, repeatedly calculate the distance between the radar device 1 and the observation target using the acquired beat signal, and repeatedly calculate the relative speed between the radar device 1 and the observation target using the acquired beat signal, and the angle calculating unit 24 to calculate the incident angle of the reflected wave to the array antenna 17 using the beat signal acquired by the distance speed calculating unit 23 and the arrangement intervals of the plurality of reception antennas 17-1 to 17-N included in the array antenna 17 that receives the reflected wave. Furthermore, the radar signal processing device 22 is configured to include the determination unit 25 to determine whether the observation target is a detection target or a non-detection target due to electromagnetic noise on the basis of the incident angle calculated by the angle calculating unit 24 and the plurality of distances and the plurality of relative speeds calculated by the distance speed calculating unit 23. Therefore, the radar signal processing device 22 can prevent erroneous detection of a non-detection target due to electromagnetic noise when the radar signal includes at least one of a transmission wave whose frequency increases with the lapse of time and a transmission wave whose frequency decreases with the lapse of time.

In the radar signal processing device 22 illustrated in FIG. 2, the noise induced in the signal wiring in each of the ADCs 21-$n$ can be regarded as having the same phase. However, since there is a difference in the wiring lengths of the respective signal wirings, noise induced in the respective signal wirings may not be regarded as having the same phase. In addition to the reception antennas 17-1 to 17-N, the transmission antenna 16 includes a plurality of antennas. Then, since the radar device 1 has a configuration of multiple input multiple output (MIMO) and corrects the phase at the time of angle calculation, the angle due to the electromagnetic noise may be a value near the correction value corresponding to the frequency $F_{sb\_\theta}=0$.

In these cases, instead of determining whether or not the absolute value of the incident angle θ is equal to or less than the first threshold $Th_1$, the determination unit 25 may determine whether or not the absolute value of the incident angle θ is equal to or less than the correction value corresponding to the frequency $F_{sb\_\theta}=0$.

Second Embodiment

In a second embodiment, a radar signal processing device 22 will be described in which a determination unit 27 determines whether or not the observation target is a non-detection target due to electromagnetic noise on the basis of an average value $v_{ave}$ of the M relative speeds v, a transmission time interval $\Delta T$ of a radar signal group necessary for single calculation of the distance and the speed by the distance speed calculating unit 23, and the absolute value $|\Delta R_M|$ of the difference $\Delta R_M$.

Figure 16:
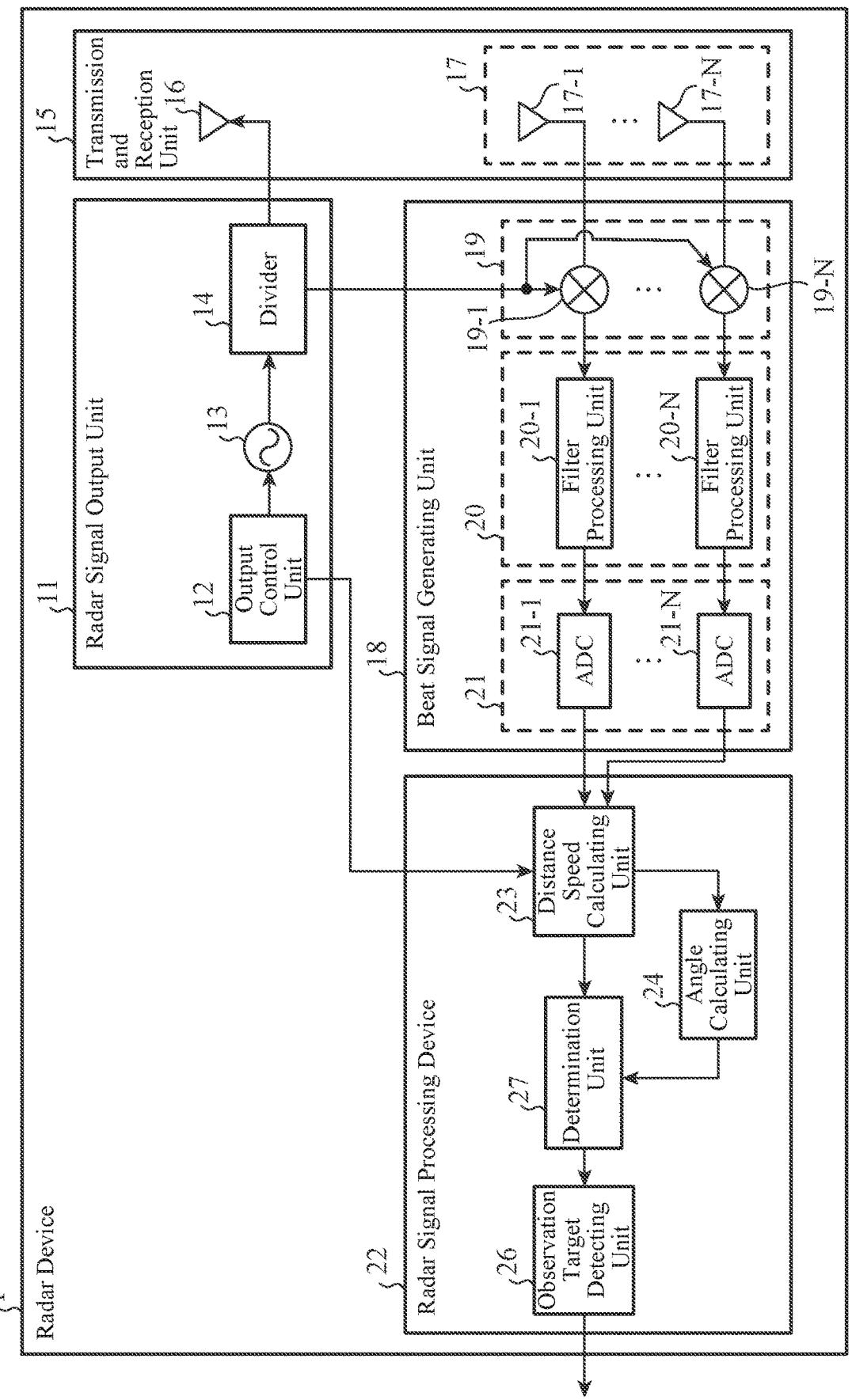
FIG. 16 is a configuration diagram illustrating a radar device 1 including a radar signal processing device 22 according to a second embodiment.

FIG. 16 is a configuration diagram illustrating the radar device 1 including the radar signal processing device 22 according to the second embodiment. In FIG. 16, the same reference numerals as those in FIG. 2 denote the same or corresponding parts, and thus description thereof is omitted.

The hardware of the radar signal processing device 22 according to the second embodiment is similar to the hardware of the radar signal processing device 22 according to the first embodiment, and a hardware configuration diagram illustrating the hardware of the radar signal processing device 22 according to the second embodiment is FIG. 3.

In the radar signal processing device 22 illustrated in FIG. 16, each of the number of distances R calculated by the distance speed calculating unit 23 and the number of relative speeds v calculated by the distance speed calculating unit 23 is M (M is an integer of 2 or more).

The determination unit 27 is implemented by, for example, the determination circuit 33 illustrated in FIG. 3.

The determination unit 27 determines whether the observation target is a detection target or a non-detection target due to electromagnetic noise on the basis of the incident angle θ calculated by the angle calculating unit 24 and the M distances and the M relative speeds calculated by the distance speed calculating unit 23.

That is, the determination unit 27 calculates the average value $v_{ave}$ of the M relative speeds v calculated by the distance speed calculating unit 23.

Figure 18:
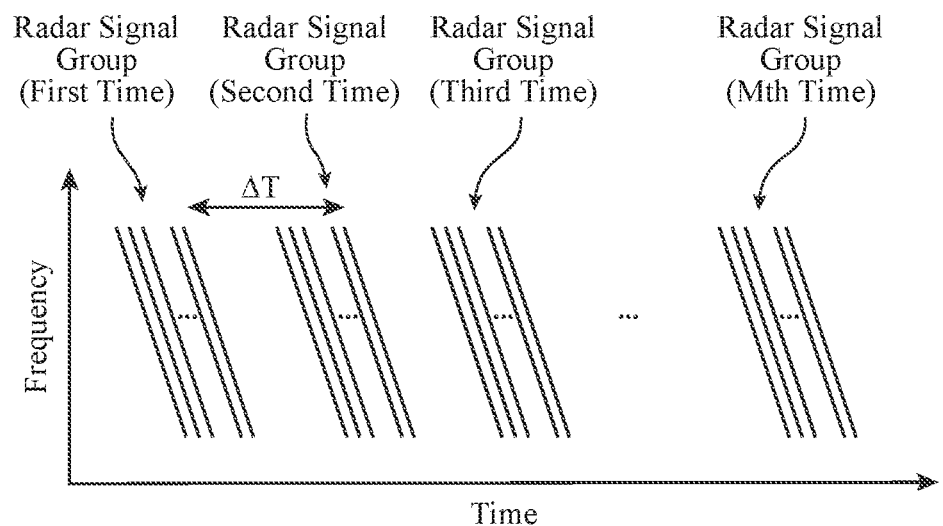
FIG. 18 is an explanatory diagram illustrating a transmission time interval ΔT of a radar signal group radiated from the radar device 1.

The determination unit 27 multiplies the average value $v_{ave}$ of the M relative speeds v, the transmission time interval $\Delta T$ (see FIG. 18) of the radar signal group necessary for single calculation of the distance and the speed by the distance speed calculating unit 23, (M−1), and a positive constant α of less than 1. FIG. 18 is an explanatory diagram illustrating the transmission time interval $\Delta T$ of a radar signal group radiated from the radar device 1.

When a multiplication result G of the average value $v_{ave}$, the time interval $\Delta T$, (M−1), and the constant α is equal to or larger than the absolute value $|\Delta R_M|$ of the difference $\Delta R_M$, the determination unit 27 determines that the observation target is a non-detection target due to electromagnetic noise.

In FIG. 16, it is assumed that each of the distance speed calculating unit 23, the angle calculating unit 24, the determination unit 27, and the observation target detecting unit 26, which are components of the radar signal processing device 22, is implemented by dedicated hardware as illustrated in FIG. 3. That is, it is assumed that the radar signal processing device 22 is implemented by the distance speed calculating circuit 31, the angle calculating circuit 32, the determination circuit 33, and the observation target detecting circuit 34.

The components of the radar signal processing device 22 are not limited to those implemented by dedicated hardware, and the radar signal processing device 22 may be implemented by software, firmware, or a combination of software and firmware.

In a case where the radar signal processing device 22 is implemented by software, firmware, or the like, a program for causing a computer to execute each of processing procedures performed in the distance speed calculating unit 23, the angle calculating unit 24, the determination unit 27, and the observation target detecting unit 26 is stored in the memory 42 illustrated in FIG. 4. Then, the processor 41 illustrated in FIG. 4 executes the program stored in the memory 42.

Next, the operation of the radar device 1 illustrated in FIG. 16 will be described. Note that, since the components other than the determination unit 27 are similar to those of the radar device 1 illustrated in FIG. 2, only the operation of the determination unit 27 will be described here.

Figure 17:
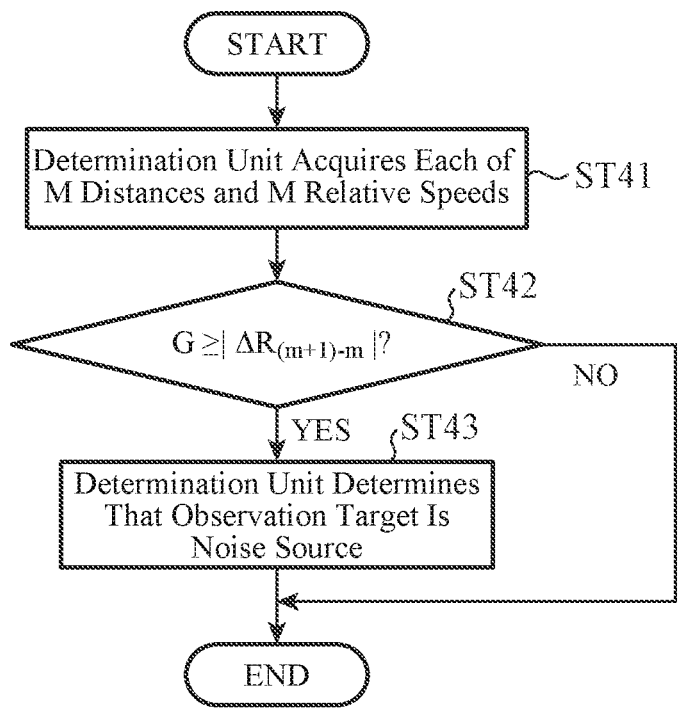
FIG. 17 is a flowchart illustrating a processing procedure performed in a determination unit 27.

FIG. 17 is a flowchart illustrating a processing procedure performed in the determination unit 27.

Similarly to the determination unit 25 illustrated in FIG. 2, the determination unit 27 compares the absolute value of the incident angle θ calculated by the angle calculating unit 24 with the first threshold $Th_1$.

If the absolute value of the incident angle θ is equal to or less than the first threshold $Th_1$, the determination unit 27 acquires M distances R and M relative speeds v from the distance speed calculation processing unit 53 of the distance speed calculating unit 23 (step ST41 in FIG. 17).

Here, in order to simplify the description, it is assumed that all of the M distances R repeatedly calculated by the distance speed calculating unit 23 are distances between the radar device 1 and the observation target or false detection distances due to electromagnetic noise.

In addition, it is assumed that all of the M relative speeds v repeatedly calculated by the distance speed calculating unit 23 are relative speeds between the radar device 1 and the observation target or relative speeds due to electromagnetic noise.

Next, the determination unit 27 calculates an average value $v_{ave}$ of the M relative speeds v, and calculates G as a multiplication result by multiplying the average value $v_{ave}$, the transmission time interval $\Delta T$ of the radar signal group, (M−1), and a positive constant α of less than 1 as expressed in the following Formula (6).

$$G = v_{ave} \times \Delta T \times (M-1) \times \alpha \tag{6}$$

In a case where the observation target is not a noise source, the absolute value $\Delta R_M$ of the difference $\Delta R_M$, which is the change in distance, is represented by the product of the speed and the time. Therefore, the change in distance should take a value corresponding to the product of the average value $v_{ave}$ of the relative speed v and the time $\Delta T \times (M-1)$ required for transmitting the M radar signal groups.

On the other hand, in a case where the observation target is a noise source, since the distance R is a value close to a constant value, the change in the distance is a value significantly smaller than the product of the average value $v_{ave}$ of the relative speeds v and the time $\Delta T \times (M-1)$ required for transmitting the M radar signal groups. Therefore, in Formula (6), by setting α to an appropriate value less than 1, it is possible to determine whether or not the observation target is a non-detection target due to electromagnetic noise. As the value of α, for example, α=½ is used. Note that the value of α is desirably set in consideration of the resolution of the distance R, the resolution of the relative speed v, the change in the relative speed v, the variation in the frequency of the assumed electromagnetic noise, and the like.

The determination unit 27 compares the multiplication result G with the absolute value $|\Delta R_M|$ of the difference $\Delta R_M$.

If the multiplication result G is equal to or larger than the absolute value $\Delta R_M$ of the difference $\Delta R_M$ (step ST42 in FIG. 17: YES), the determination unit 27 determines that the observation target is a non-detection target and is a noise source (step ST43 in FIG. 17).

When the multiplication result G is less than the absolute value $|\Delta R_M|$ of the difference $\Delta R_M$ and one or more relative speeds v among the M relative speeds v are equal to or less than the third threshold $Th_3$, the determination unit 27 determines that the observation target is a detection target and is not a noise source.

When the multiplication result G is less than the absolute value $\Delta R_M$ of the difference $\Delta R_M$ and all of the M relative speeds v are larger than the third threshold $Th_3$, the determination unit 27 determines that the observation target is a non-detection target and is a noise source.

In the second embodiment described above, the radar signal processing device 22 illustrated in FIG. 16 is configured in such a way that the determination unit 27 determines that the observation target is a non-detection target due to electromagnetic noise when the multiplication result of the average value of the M relative speeds calculated by the distance speed calculating unit 23, the time interval of the radar signal radiated from the radar device 1, (M−1), and the positive constant of less than 1 is equal to or greater than the absolute value of the difference between the distance calculated first by the distance speed calculating unit 23 and the distance calculated Mth. Therefore, similarly to the radar signal processing device 22 illustrated in FIG. 2, the radar signal processing device 22 illustrated in FIG. 16 can prevent erroneous detection of a non-detection target due to electromagnetic noise as long as the radar signal includes at least one of a transmission wave whose frequency increases with the lapse of time and a transmission wave whose frequency decreases with the lapse of time.

It should be noted that the present disclosure can freely combine the embodiments, modify any component of each of the embodiments, or omit any component in each of the embodiments.

INDUSTRIAL APPLICABILITY

The present disclosure is suitable for a radar signal processing device and a radar signal processing method for calculating a distance from a radar device to an observation target.

The present disclosure is suitable for a radar device including a radar signal processing device and an in-vehicle device including the radar device.

REFERENCE SIGNS LIST

1: radar device, 11: radar signal output unit, 12: output control unit, 13: signal source, 14: divider, 15: transmission and reception unit, 16: transmission antenna, 17: array antenna, 17-1 to 17-N: reception antenna, 18: beat signal generating unit, 19: frequency mixing unit, 19-1 to 19-N: mixer, 20: filter unit, 20-1 to 20-N: filter processing unit, 21: analog-to-digital converter, 21-1 to 21-N: ADC, 22: radar signal processing device, 23: distance speed calculating unit, 24: angle calculating unit, 25, 27: determination unit, 26: observation target detecting unit, 31: distance speed calculating circuit, 32: angle calculating circuit, 33: determination circuit, 34: observation target detecting circuit, 41: processor, 42: memory, 51: first spectrum calculating unit, 52: second spectrum calculating unit, 53: distance speed calculation processing unit, 61: third spectrum calculating unit, 62: angle calculation processing unit

The invention claimed is:

1. A radar signal processing device comprising:
processing circuitry configured to
repeatedly acquire a beat signal having a frequency of a difference between a frequency of a radar signal whose frequency changes with a lapse of time and a frequency of a reflected wave of the radar signal reflected by an observation target, repeatedly calculate at least one distance between a radar device and the observation target using the acquired beat signal, the at least one distance comprising a plurality of distances, and repeatedly calculate at least one relative speed between the radar device and the observation target using the acquired beat signal, the at least one relative speed comprising a plurality of relative speeds;
calculate an incident angle of the reflected wave to an array antenna by using the acquired beat signal and an arrangement interval between a plurality of reception antennas included in the array antenna that receives the reflected wave; and
determine whether the observation target is a detection target or a non-detection target due to electromagnetic noise on a basis of the calculated incident angle and the plurality of distances and the plurality of relative speeds having been calculated,
wherein the processing circuitry performs determination processing of determining whether the observation target is the detection target or the non-detection target due to electromagnetic noise on a basis of the plurality of distances and the plurality of relative speeds only when an absolute value of the calculated incident angle is equal to or less than a first threshold.

2. The radar signal processing device according to claim 1,
wherein when the number of distances having been calculated is M (M is an integer of 2 or more), the absolute value of a difference between a first distance having been calculated and an Mth distance having been calculated is equal to or less than a second threshold, and all absolute values of the plurality of relative speeds having been calculated are equal to or more than a third threshold, the processing circuitry determines that the observation target is the non-detection target due to electromagnetic noise.

3. The radar signal processing device according to claim 1,
wherein when each of the number of calculated distances and the number of relative speeds having been calculated is M (M is an integer of 2 or more), and when a result of multiplication of an average value of the M relative speeds having been calculated, a transmission time interval of a radar signal group necessary for single calculation of a distance and a speed, (M−1), and a positive constant of less than 1 is equal to or greater than an absolute value of a difference between a first calculated distance and an Mth calculated distance, the processing circuitry determines that the observation target is the non-detection target due to electromagnetic noise.

4. The radar signal processing device according to claim 1,
wherein the processing circuitry is further configured to output the at least one distance and the at least one relative speed having been calculated and the calculated incident angle as a detection result of the observation target when the processing circuitry determines that the observation target is the detection target.

5. The radar signal processing device according to claim 4,
wherein when the processing circuitry determines that the observation target is the non-detection target, the processing circuitry outputs information indicating that the non-detection target due to electromagnetic noise has been detected.

6. A radar signal processing method comprising:
repeatedly acquiring a beat signal having a frequency of a difference between a frequency of a radar signal whose frequency changes with a lapse of time and a frequency of a reflected wave of the radar signal reflected by an observation target;
repeatedly calculating at least one distance between a radar device and the observation target using the acquired beat signal, the at least one distance comprising a plurality of distances;
repeatedly calculating at least one relative speed between the radar device and the observation target using the acquired beat signal, the at least one relative speed comprising a plurality of relative speeds;
calculating an incident angle of the reflected wave to an array antenna by using the acquired beat and an arrangement interval between a plurality of reception antennas included in the array antenna that receives the reflected wave;
determining whether the observation target is a detection target or a non-detection target due to electromagnetic noise on a basis of the calculated incident angle and the plurality of distances and the plurality of relative speeds having been calculated; and
performing determination processing of determining whether the observation target is the detection target or the non-detection target due to electromagnetic noise on a basis of the plurality of distances and the plurality of relative speeds having been calculated only when an absolute value of the calculated incident angle is equal to or less than a first threshold.

7. A radar device comprising the radar signal processing device according to claim 1.

8. An in-vehicle device comprising the radar device according to claim 7.

* * * * *